US007199730B2

(12) United States Patent
Matsuda

(10) Patent No.: US 7,199,730 B2
(45) Date of Patent: Apr. 3, 2007

(54) CHARACTER STRING PROCESSING APPARATUS, CHARACTER STRING PROCESSING METHOD, AND IMAGE-FORMING APPARATUS

(75) Inventor: Toru Matsuda, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 630 days.

(21) Appl. No.: 10/758,219

(22) Filed: Jan. 16, 2004

(65) Prior Publication Data

US 2004/0187061 A1    Sep. 23, 2004

(30) Foreign Application Priority Data

Jan. 24, 2003  (JP)  .............. 2003-016427
Jan. 9, 2004   (JP)  .............. 2004-004123

(51) Int. Cl.
*H03M 7/00*   (2006.01)
*G06F 17/21*  (2006.01)
*G03G 15/00*  (2006.01)

(52) U.S. Cl. ........................... 341/55; 707/101

(58) Field of Classification Search .......... 341/51, 341/55, 106; 707/100

See application file for complete search history.

(56) References Cited

U.S. PATENT DOCUMENTS

| 4,860,214 | A |   | 8/1989  | Matsuda et al. |
| 5,148,541 | A | * | 9/1992  | Lee et al. ............. 707/2 |
| 5,150,430 | A | * | 9/1992  | Chu ................... 382/246 |
| 5,338,976 | A |   | 8/1994  | Anwyl et al. |
| 5,889,481 | A | * | 3/1999  | Okada .................. 341/51 |
| 6,204,782 | B1 | * | 3/2001  | Gonzalez et al. ........ 341/90 |
| 6,687,829 | B1 |   | 2/2004  | Miyamoto et al. |
| 6,701,320 | B1 | * | 3/2004  | Marple ................ 707/100 |
| 7,039,688 | B2 |   | 5/2006  | Matsuda et al. |
| 2002/0133573 | A1 | | 9/2002  | Matsuda et al. |
| 2003/0218771 | A1 | | 11/2003 | Mihira |
| 2003/0225894 | A1 | | 12/2003 | Ito |
| 2004/0030986 | A1 | | 2/2004  | Matsuda |
| 2004/0068549 | A1 | | 4/2004  | Motoyama |
| 2004/0070782 | A1 | | 4/2004  | Mihira |
| 2004/0080771 | A1 | | 4/2004  | Mihira et al. |
| 2006/0075474 | A1 | | 4/2006  | Takeuchi et al. |
| 2006/0106803 | A1 | | 5/2006  | Takeuchi et al. |

FOREIGN PATENT DOCUMENTS

| JP | 04256192 A | * | 9/1992 |
| JP | 11-512543  |   | 10/1999 |
| WO | WO 97/10556 |  | 3/1997 |

* cited by examiner

*Primary Examiner*—Howard L. Williams
(74) *Attorney, Agent, or Firm*—Oblon, Spivak, McClelland, Maier & Neustadt, P.C.

(57) ABSTRACT

A character string processing apparatus converting a character string encoded by a first encoding method to a second encoding method selected from a plurality of encoding methods is disclosed. The character string processing apparatus includes an encoding method determination part that selects the encoding methods, obtains, with respect to each selected encoding method, at least one of the number information and the position information of one or more replacement codes at the time of converting the character string to the selected encoding method, and determines the second encoding method based on at least one of the number information and the position information.

20 Claims, 20 Drawing Sheets

FIG.7

| CHARACTER | UTF-8 | Shift_JIS | Latin1 |
|---|---|---|---|
| ... | ... | ... | ... |
| 1 | 31 | 31 | 31 |
| ... | ... | ... | ... |
| € | E2 82 AC | | 80 |
| ... | ... | ... | ... |
| ぉ | E3 86 AC | | |
| ... | ... | ... | ... |
| 円 | E5 86 86 | 89 7E | |
| ... | ... | ... | ... |

FIG.11

```
-<SOAP-ENV:Envelope xmlns:SOAP-
ENV="http://schemas.xmlsoap.org/soap/envelope/" xmlns:SOAP-
ENC="http://schemas.xmlsoap.org/soap/encoding/"
xmlns:xsi="http://www.w3.org/2001/XMLSchema-instance"
xmlns:xsd="http://www.w3.org/2001/XMLSchema" SOAP-
ENV:encodingStyle="http://schemas.xmlsoap.org/soap/encoding/"
xmlns:m0="http://schemas.ricoh.co.jp/commontypes">
 <SOAP-ENV:Body>
- <m:setTitle xmlns:m="http://soapdefs.ricoh.co.jp/repository">
    <id xsi:type="xsd:anyURI">doc1234</id>
    <value xsi:type="xsd:string">Göte伊</value>
  </m:setTitle>
 </SOAP-ENV:Body>
</SOAP-ENV:Envelope>
```

FIG.13

| CHARACTER | UTF-8 | Shift_JIS | Latin1 |
|---|---|---|---|
| ... | ... | ... | ... |
| G | 47 | 47 | 47 |
| ... | ... | ... | ... |
| ö | C3 B6 | ... | F6 |
| ... | ... | ... | ... |
| 作 | E4 BD 9C | 8D EC | ... |
| ... | ... | ... | ... |
| ぉ | E3 86 82 | ... | ... |
| ... | ... | ... | ... |

FIG.14

| DOCUMENT ID | DOCUMENT NAME ENCODING METHOD ID | DOCUMENT NAME CHARACTER STRING DATA | AUTHOR NAME ENCODING METHOD ID | AUTHOR NAME CHARACTER STRING DATA | OTHER INFORMATION |
|---|---|---|---|---|---|

FIG.15

| ORIGINAL CHARACTER STRING (UTF-8) | CONVERTED CHARACTER STRING (INTERNAL ENCODING METHOD) | RE-CONVERTED CHARACTER STRING (UTF-8) |
|---|---|---|
| Göte作 | G[?]te作 (Shift_JIS) | G[?]te作 |
| Göte作 | Göte[?] (Latin1) | Göte[?] |

FIG.16

| Shift_JIS | | UTF-8 FOR WINDOWS | | UTF-8 FOR MAC | |
|---|---|---|---|---|---|
| CHARACTER | CODE | CHARACTER NAME | CODE | CHARACTER NAME | CODE |
| ¥ | 5C | BACKSLASH | 5C | YEN SIGN | C2 A5 |
| ~ | 7E | TILDE | 7E | OVERLINE | E2 80 BE |
| ‖ | 81 60 | FULLWIDTH TILDE | EF BD 9E | WAVY DASH | E3 80 9C |
| = | 81 61 | PARALLEL TO | E2 88 A5 | DOUBLE VERTICAL LINE | E2 80 96 |
| − | 81 7C | FULLWIDTH HYPHEN | EF BC 8D | MINUS SIGN | E2 88 92 |
| ¢ | 81 91 | FULLWIDTH CENT SIGN | EF BF A0 | CENT SIGN | C2 A2 |
| £ | 81 92 | FULLWIDTH POUND SIGN | EF BF A1 | POUND SIGN | C2 A3 |
| ¬ | 81 CA | FULLWIDTH NOT SIGN | EF BF A2 | NOT SIGN | C2 AC |

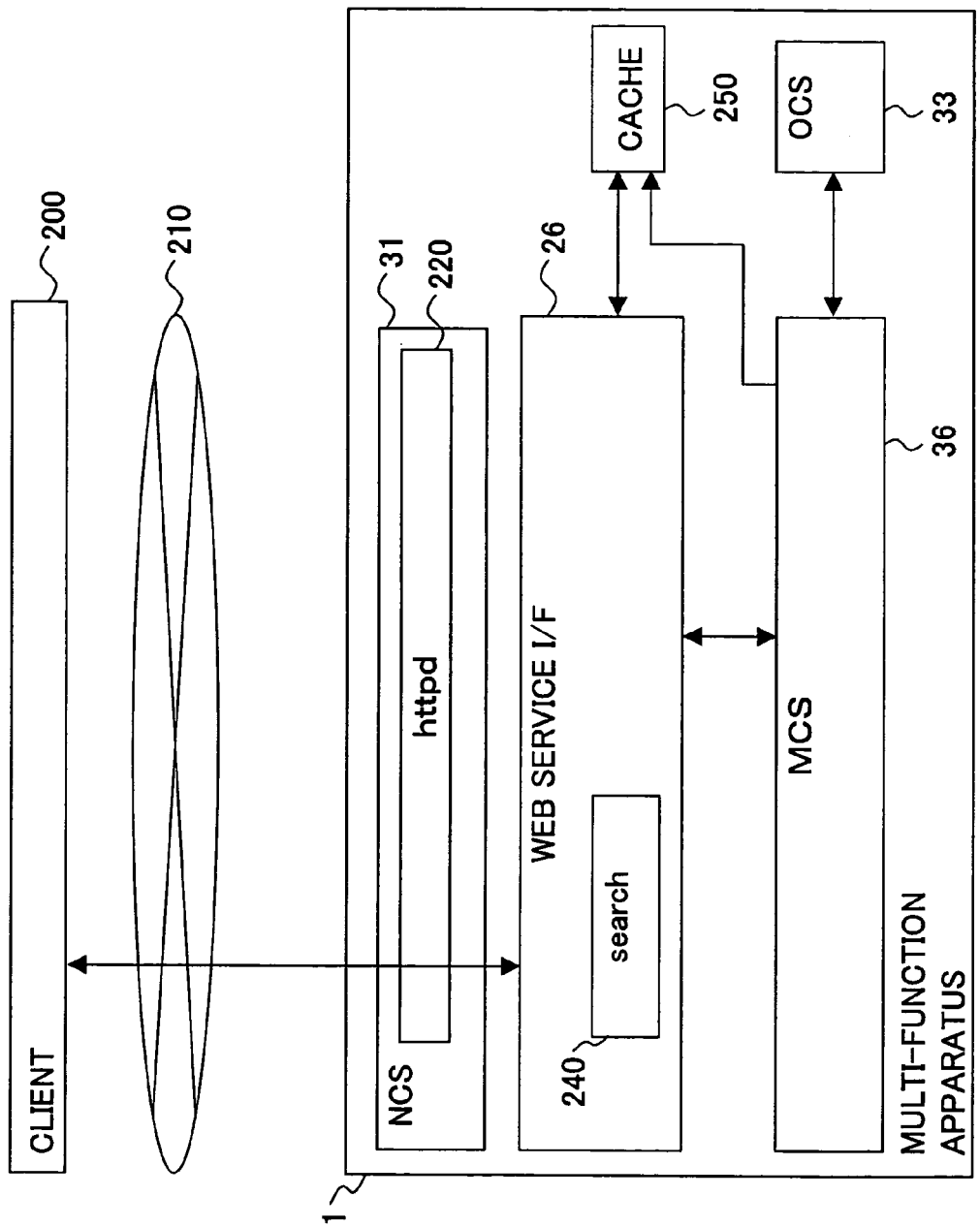

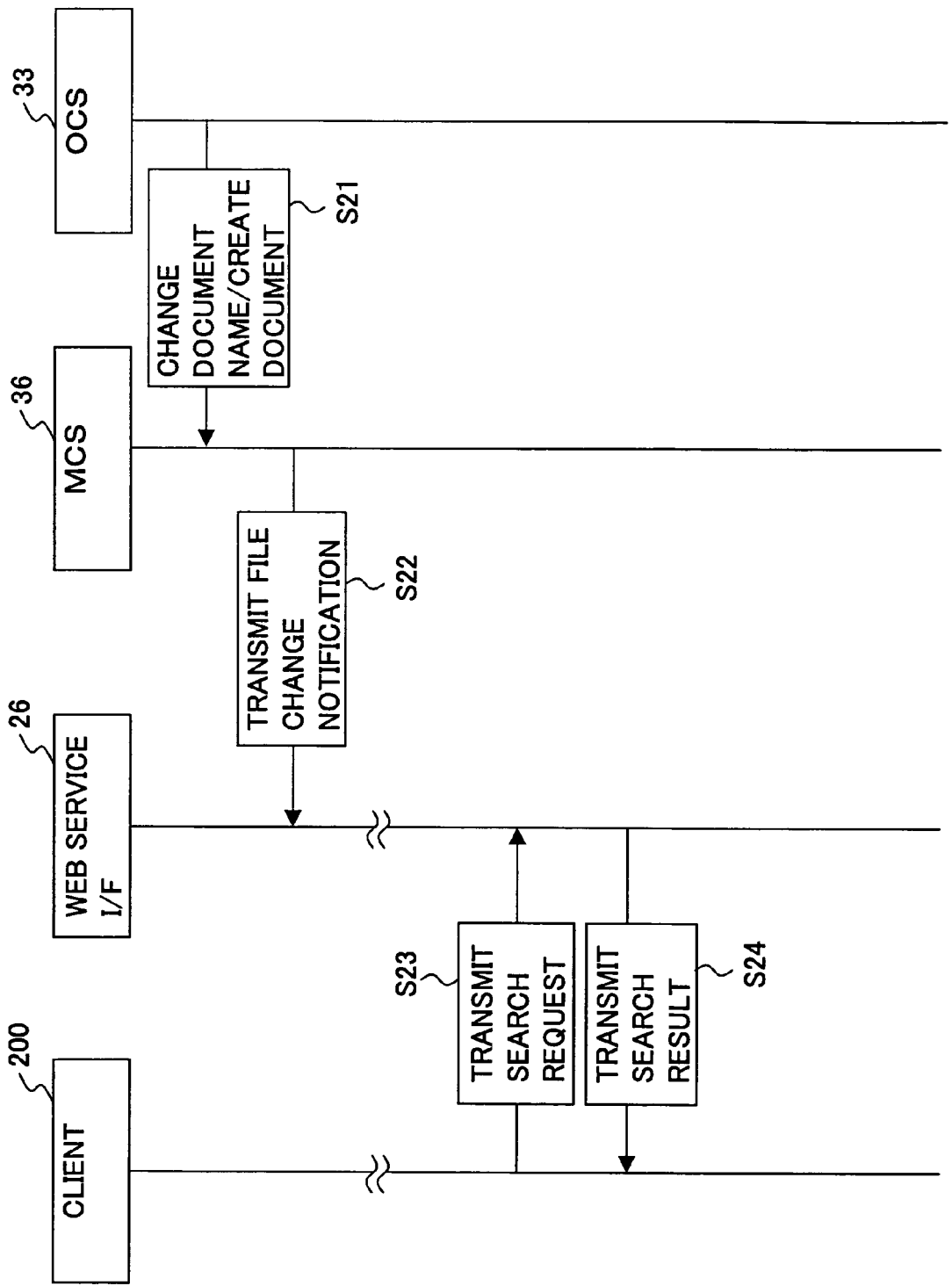

FIG.20

```
- <SOAP-ENV:Envelope xmlns:SOAP-
    ENV="http://schemas.xmlsoap.org/soap/envelope/" xmlns:SOAP-
    ENC="http://schemas.xmlsoap.org/soap/encoding/"
    xmlns:xsi="http://www.w3.org/2001/XMLSchema-instance"
    xmlns:xsd="http://www.w3.org/2001/XMLSchema" SOAP-
    ENV:encodingStyle="http://schemas.xmlsoap.org/soap/encoding/"
    xmlns:m0="http://schemas.xmlsoap.org/soap/encoding/"
    xmlns:m1="http://schemas.ricoh.co.jp/repository">
  - <SOAP-ENV:Body>
    - <m:search xmlns:m="http://soapdefs.ricoh.co.jp/repository">
      - <condition>
          <operator>CONTAINS_ANY_AT_HEAD</operator>
          <propName>title</propName>
          <propVal>Göte</propVal>
        </condition>
      </m:search>
    </SOAP-ENV:Body>
  </SOAP-ENV:Envelope>
```

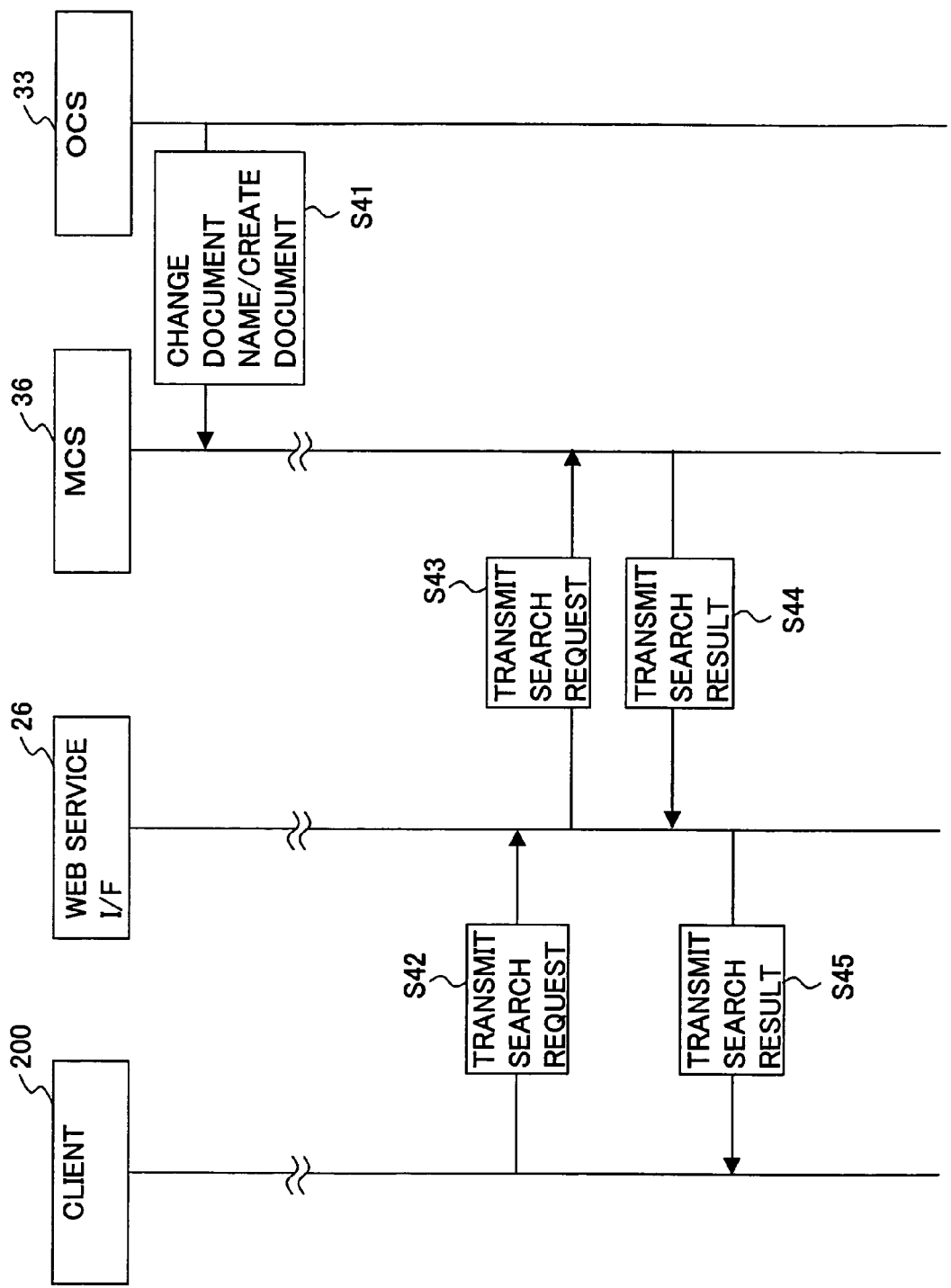

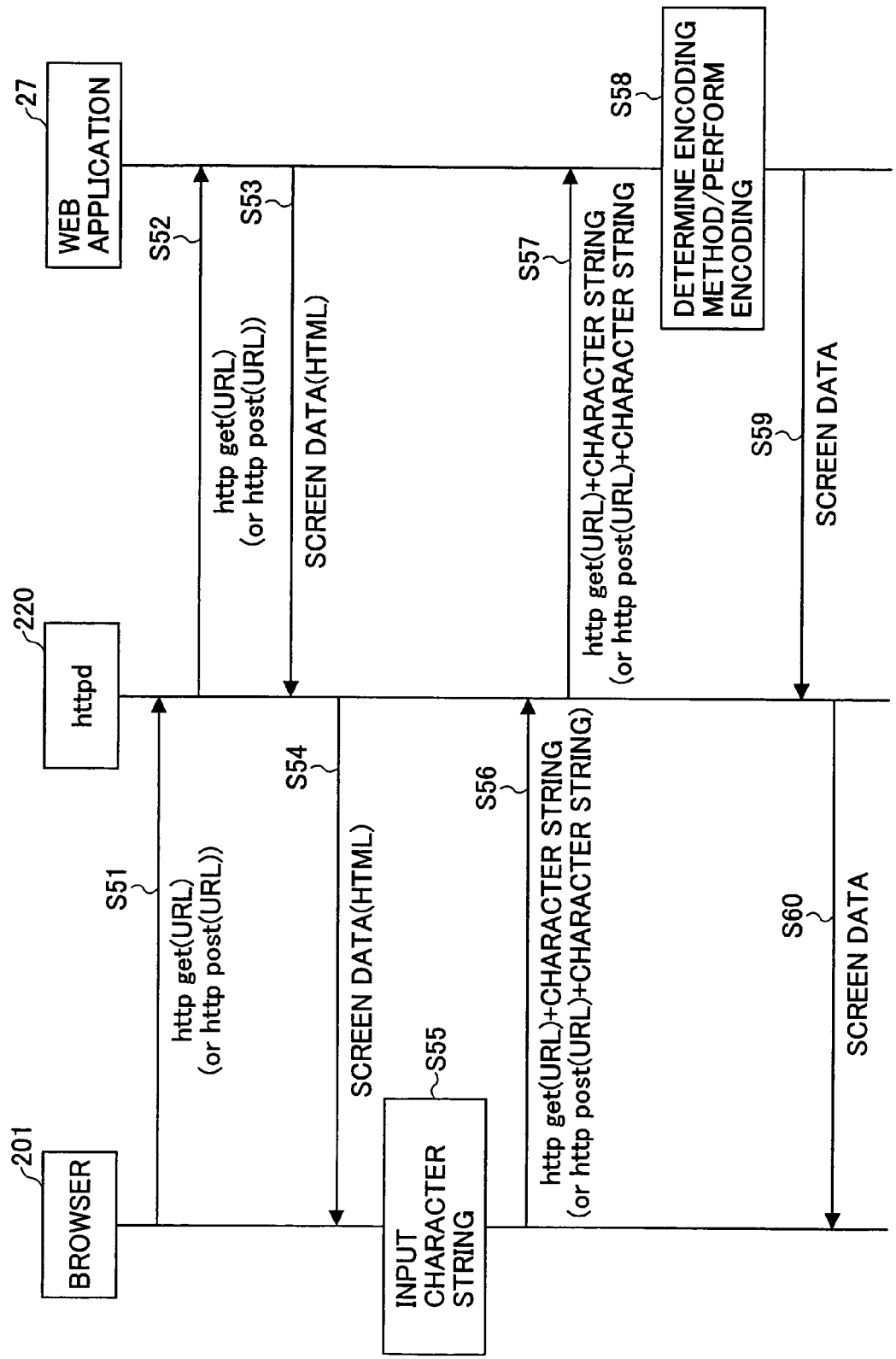

CHARACTER STRING PROCESSING APPARATUS, CHARACTER STRING PROCESSING METHOD, AND IMAGE-FORMING APPARATUS

BACKGROUND OF THE INVENTION

1. Field of the Invention

The present invention relates generally to character string processing apparatuses, character string processing methods, and image-forming apparatuses, and more particularly to a character string processing apparatus, a character string processing method, and an image-forming apparatus that convert a character string encoded by an encoding method (a character code set) to a character string encoded by another encoding method.

2. Description of the Related Art

Encoding methods convert characters and signs (hereinafter referred to simply as characters) to their respective character codes assigned thereto so as to handle the characters on a computer. Normally, different encoding methods are used depending on languages or computer systems. The Internet, for instance, employs UTF-8 or UTF-16 using Unicode as a standard encoding method so as to support the world's major languages. Further, character string processing apparatuses and image-forming apparatuses employ Shift-JIS or Latin1 as an encoding method.

The character string processing apparatuses, which normally can use a plurality of encoding methods, convert a character string encoded by one encoding method to a character string encoded by another encoding method as required. The image-forming apparatuses have a small number of encoding methods as necessary and sufficient prepared in a user interface in accordance with the language of their purchaser so as to save the capacity of a font ROM.

Conventionally, a character string processing apparatus or an image-forming apparatus connected to a network such as the Internet, when receiving a request including a character string represented in, for instance, Unicode (such as a request to change a document name) from the network side, converts the character string to a character string encoded by an encoding method used in internal processing.

Japanese Translation of PCT International Application No. 11-512543 discloses a technique for converting a character string encoded by one encoding method to a character string encoded by another encoding method.

Normally, the character string processing apparatuses and the image-forming apparatuses can use a plurality of encoding methods, and accordingly, are required to select an encoding method to use.

Representable character sets, however, differ among encoding methods. Therefore, a character that is representable by an encoding method before conversion is not necessarily representable by another encoding method after the conversion. Accordingly, there is a problem in that it may not be possible to convert all character strings completely, depending on the combination of the encoding methods before and after the conversion.

For instance, a character set representable by an encoding method employed in the internal processing of a character string processing apparatus or an image-forming apparatus, such as Shift-JIS or Latin1, does not necessarily include all of the characters of a character set representable in Unicode. Accordingly, even if a character is representable in Unicode, the character is not necessarily representable by an encoding method employed in internal processing.

Thus, the selection of an encoding method is important to the conventional character string processing apparatuses and image-forming apparatuses because the number of inconvertible characters differs depending on which encoding method to select to convert a character string encoded by another encoding method. Further, to the conventional character string processing apparatuses and image-forming apparatuses, the handling of characters that have failed to be converted is also important in the case of, for instance, collating the converted character string. Furthermore, some encoding methods assign different character codes to a single character, and the handling of such an exceptional character is also important.

SUMMARY OF THE INVENTION

Accordingly, it is a general object of the present invention to provide a character string processing apparatus, a character string processing method, and an image-forming apparatus in which the above-described disadvantage is eliminated.

A more specific object of the present invention is to provide a character string processing apparatus, a character string processing method, and an image-forming apparatus that can select an appropriate encoding method at the time of converting a character string encoded by a first encoding method to a second encoding method, and can suitably handle the converted character string representable by the second encoding method.

The above objects of the present invention are achieved by a character string processing apparatus converting a character string encoded by a first encoding method to a second encoding method selected from a plurality of encoding methods, the character string processing apparatus including an encoding method determination part that selects the encoding methods, obtains, with respect to each selected encoding method, at least one of number information and position information of one or more replacement codes at a time of converting the character string using the selected encoding method, and determines the second encoding method based on at least one of the number information and the position information.

The above objects of the present invention are also achieved by a character string processing apparatus that, using a first character string encoded by a first encoding method, collates a second character string encoded by a second encoding method, the character string processing apparatus including a character string collation part that converts the second character string to the first encoding method, and at a time of collating the converted second character string with the first character string, treats a replacement code included in the converted second character string as a character having a role of representing any character.

The above objects of the present invention are also achieved by a character string processing method converting a character string encoded by a first encoding method to a second encoding method selected from a plurality of encoding methods, the character string processing method including the steps of: (a) selecting the encoding methods; (b) obtaining, with respect to each selected encoding method, at least one of number information and position information of one or more replacement codes at a time of converting the character string using the selected encoding method; and (c) determining the second encoding method based on at least one of the number information and the position information.

The above objects of the present invention are also achieved by a character string processing method that, using a first character string encoded by a first encoding method, collates a second character string encoded by a second encoding method, the character string processing method including the steps of: (a) converting the second character string to the first encoding method; and (b) collating the converted second character string with the first character string, treating a replacement code included in the converted second character string as a character having a role of representing any character.

The above objects of the present invention are also achieved by an image-forming apparatus including a character string processing part converting a character string encoded by a first encoding method to a second encoding method selected from a plurality of encoding methods, the image-forming apparatus including an encoding method determination part that selects the encoding methods, obtains, with respect to each selected encoding method, at least one of number information and position information of one or more replacement codes at a time of converting the character string using the selected encoding method, and determines the second encoding method based on at least one of the number information and the position information.

The above objects of the present invention are further achieved by an image-forming apparatus including a character string processing part that, using a first character string encoded by a first encoding method, collates a second character string encoded by a second encoding method, the image-forming apparatus including a character string collation part that converts the second character string to the first encoding method, and at a time of collating the converted second character string with the first character string, treats a replacement code included in the converted second character string as a character having a role of representing any character.

According to the present invention, when a first character string encoded by a first encoding method is converted to a second character string encoded by a second encoding method, the second encoding method may be determined based on the number information and the position information of one or more replacement codes (the number of replacement codes and the position of each replacement code). Further, according to the present invention, a replacement code included in the second character string encoded by the second encoding method may be treated as a character having the role of representing any character (as a wild card).

Thus, the character string processing apparatus, the character string processing method, and the image-forming apparatus according to the present invention, when converting a character string encoded by a first encoding method to a second encoding method, can select an appropriate encoding method as the second encoding method and suitably handle the converted character string represented by the second encoding method.

BRIEF DESCRIPTION OF THE DRAWINGS

Other objects, features and advantages of the present invention will become more apparent from the following detailed description when read in conjunction with the accompanying drawings, in which:

FIG. 7 is a lookup table showing character codes assigned to characters in each of the encoding methods;

FIG. 11 is a diagram showing the structure of a SOAP message requesting to change a document name according to the first embodiment of the present invention;

FIG. 13 is a lookup table showing character code assignment according to each of UTF-8, Shift-JIS, and Latin1 according to the first embodiment of the present invention;

FIG. 14 is a diagram showing a bibliographic information data format according to the first embodiment of the present invention;

FIG. 15 is a diagram for illustrating collation of character strings according to a second embodiment of the present invention;

FIG. 16 is a table in which exceptional characters are set according to the second embodiment of the present invention;

FIG. 17 is a block diagram showing a configuration of the multi-function apparatus for illustrating a character string processing method according to the second embodiment of the present invention;

FIG. 18 is a sequence diagram for illustrating the operation of collating character strings according to the second embodiment of the present invention;

FIG. 20 is a diagram showing the structure of a SOAP message requesting to search for a document name according to the second embodiment of the present invention;

FIG. 21 is a sequence diagram for illustrating the operation of collating character strings according to the second embodiment of the present invention;

FIG. 23 is a sequence diagram for illustrating the character string processing method according to the third embodiment of the present invention.

DETAILED DESCRIPTION OF THE PREFERRED EMBODIMENTS

A description is given below, with reference to the accompanying drawings, of embodiments of the present invention.

First, a description is given, with respect to FIGS. 1 through 7, of the principles of the present invention to facilitate an understanding thereof. FIGS. 1 through 6 are diagrams showing that representable character sets differ among encoding methods. FIG. 7 is a lookup table showing character codes assigned to characters in each encoding method.

In FIGS. 1 through 6, $\Omega$ represents a set of all characters, A represents a set of characters encodable by an encoding method a, B represents a set of characters encodable by an encoding method b, and C represents a set of characters encodable by an encoding method c.

Figure 1:
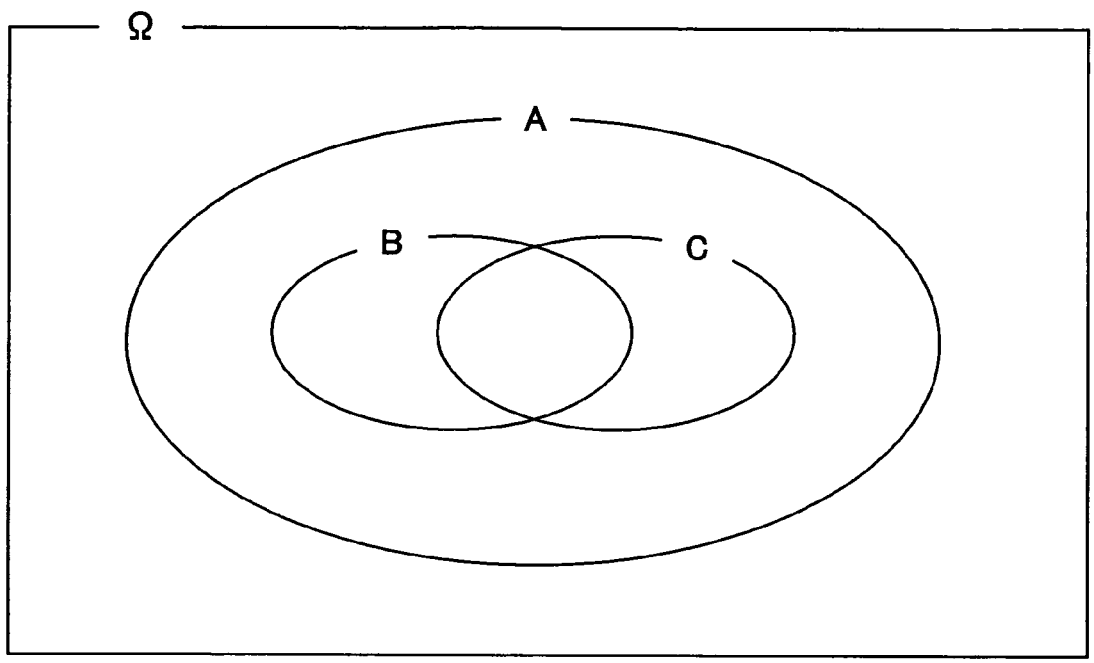
FIGS. 1 through 6 are diagrams showing that representable character sets differ among encoding methods.

FIG. 1 shows that the character set A includes a character set B∪C encodable by the encoding method b or c. The relationship of FIG. 1 is established when, for instance, the encoding method a is UTF-8, the encoding method b is Shift-JIS, and the encoding method c is Latin1. The lookup table of the case where the encoding method a is UTF-8, the encoding method b is Shift-JIS, and the encoding method c is Latin1 is shown in FIG. 7.

Figure 2:
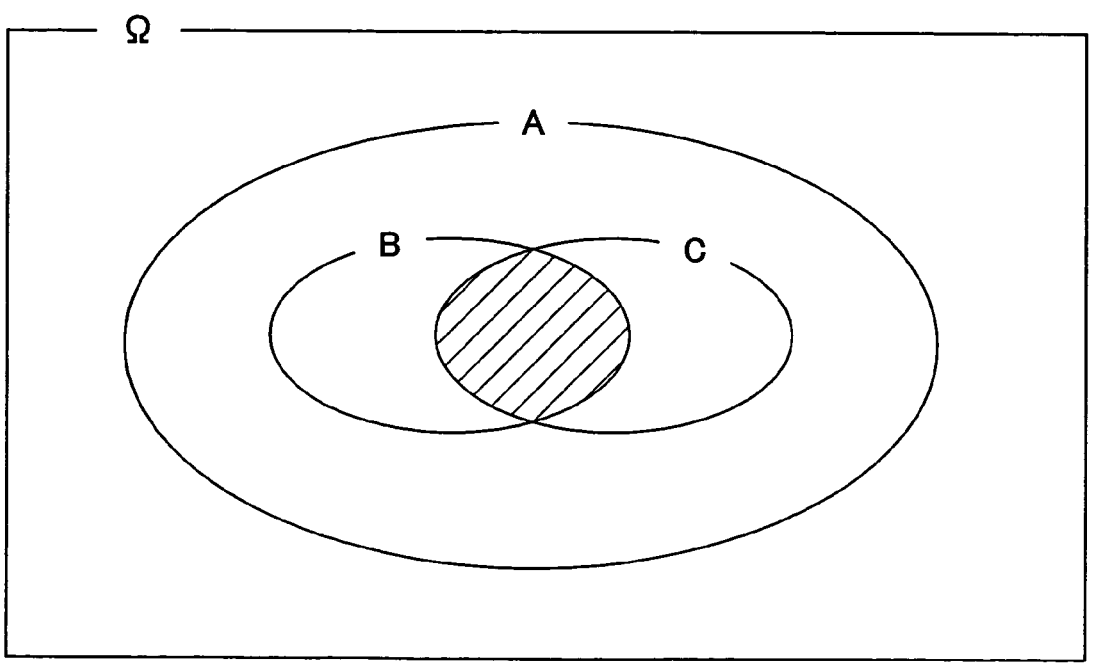

FIG. 2 shows a character set A∩B∩C encodable by the encoding methods a, b, and c as a hatched part. According to the lookup table of FIG. 7, a character "1," for instance, is included in the hatched part of FIG. 2. Conversion from a character encoded by one encoding method to a character encoded by another encoding method is performable with respect to the characters included in the hatched part of FIG. 2.

Figure 3:
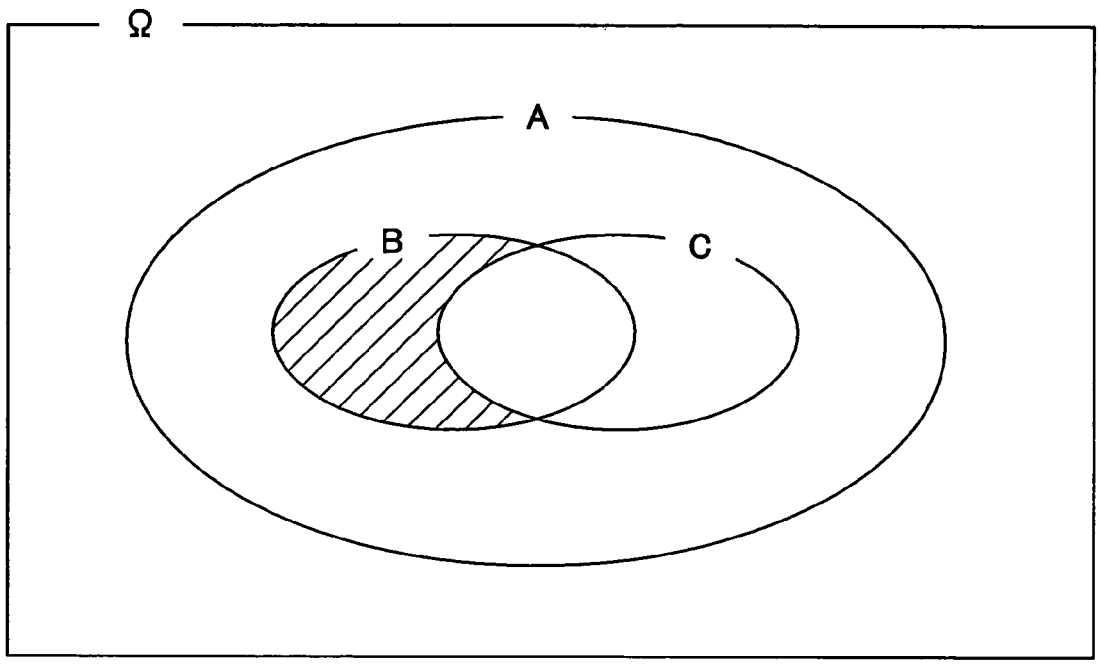

FIG. 3 shows a character set A∩B−C encodable by the encoding methods a and b and unencodable by the encoding method c as a hatched part. According to the lookup table of FIG. 7, a character "円," for instance, is included in the hatched part of FIG. 3. Conversion from a character encoded by one encoding method to a character encoded by the encoding method c is not performable with respect to the characters included in the hatched part of FIG. 3.

According to the present invention, in the case of converting a character included in the hatched part of FIG. 3 by the encoding method c, the character is replaced with a replacement code. A character code not assigned to a character is employed as the replacement code.

For instance, a 2-byte character code obtained by extending an encoding method that can represent a character by 1 byte is employable as the replacement code. It is also possible to employ a character code in a gap to which no character is assigned. Further, a control character not employed in the character string processing apparatuses and the image-forming apparatuses, such as DELETE, is also employable.

Figure 4:
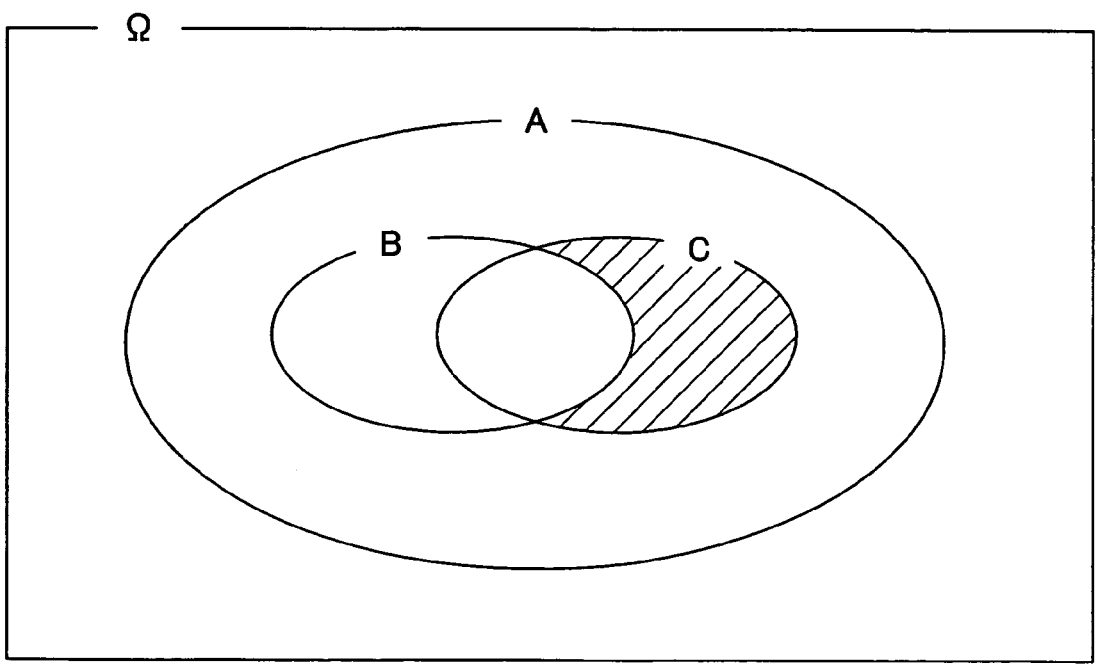

FIG. 4 shows a character set A∩C−B encodable by the encoding methods a and c and unencodable by the encoding method b as a hatched part. According to the lookup table of FIG. 7, a character "é"

is included in the hatched part of FIG. 4. Conversion from a character encoded by one encoding method to a character encoded by the encoding method b is not performable with respect to the characters included in the hatched part of FIG. 4. According to the present invention, in the case of converting a character included in the hatched part of FIG. 4 by the encoding method b, the character is replaced with a replacement code.

Figure 5:
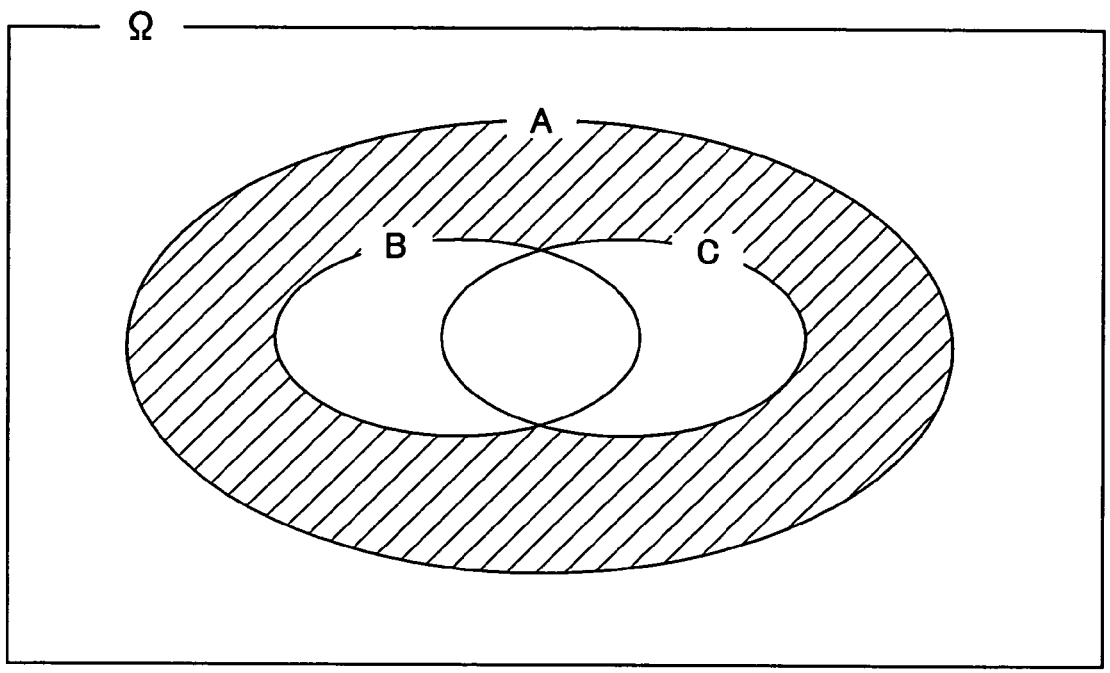

FIG. 5 shows a character set A−(B∪C) encodable by the encoding method a and unencodable by the encoding method b or c as a hatched part. According to the lookup table of FIG. 7, a character "α"

is included in the hatched part of FIG. 5. Conversion from a character encoded by one encoding method to a character encoded by the encoding method b or c is not performable with respect to the characters included in the hatched part of FIG. 5. According to the present invention, in the case of converting a character included in the hatched part of FIG. 5 by the encoding method b or c, the character is replaced with a replacement code.

Figure 6:
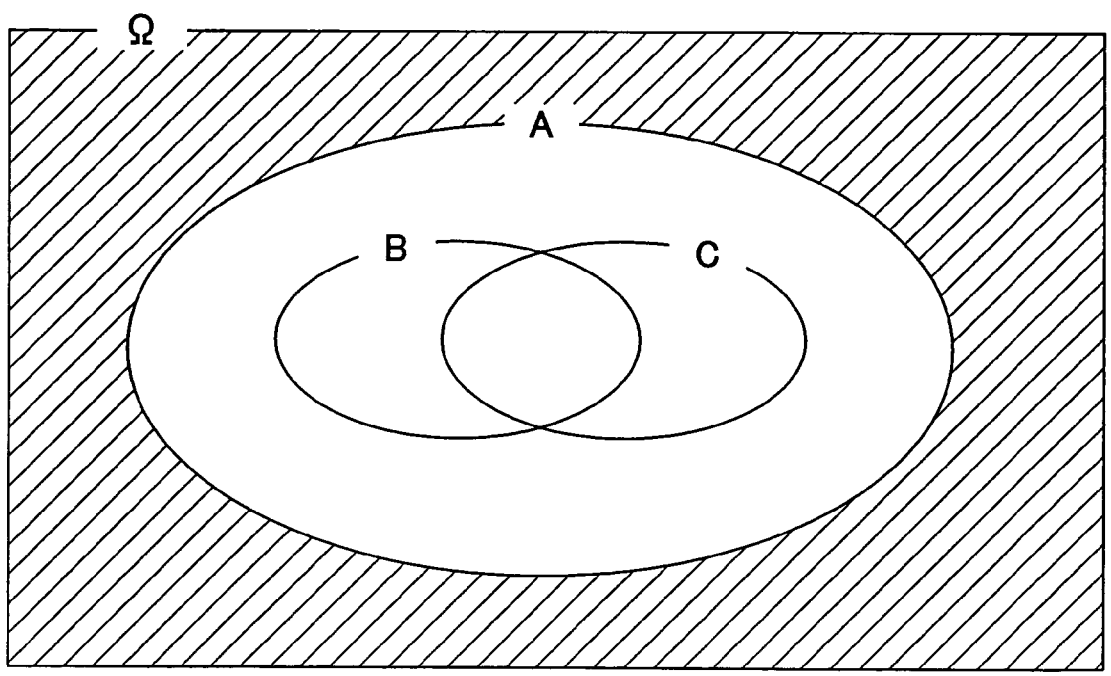

FIG. 6 shows a character set $\overline{A}$ that is convertible by none of the encoding methods a, b, and c as a hatched part. Conversion from a character encoded by one encoding method to a character encoded by the encoding method a, b or c is not performable with respect to the characters included in the hatched part of FIG. 6. If a character that is not convertible to the encoding method a is represented by a character code, it is considered that the character is represented by a replacement code from the beginning. Therefore, according to the present invention, in the case of converting the character included in the hatched part of FIG. 6 to the encoding method b or c, the replacement code according to the encoding method a is replaced with a replacement code according to the encoding method b or c. The character replaced with the replacement code is displayed on an operation screen such as an operation panel as "□" as an unidentifiable character.

A character string processing apparatus according to the present invention, when a plurality of encoding methods are available, selects an encoding method based on at least one of the number of characters replaced with replacement codes, the position of a character replaced with a replacement code, and the priorities of the encoding methods, which is described below.

The following description focuses on processing in an image-forming apparatus as an example of a character string processing apparatus using a character string processing method according to the present invention. However, the present invention is applicable to any apparatus that converts a character string encoded by one encoding method to a character string encoded by another encoding method.

The image-forming apparatus described in the following embodiments, which contains the functions of apparatuses such as a printer, a copier, a facsimile machine, and a scanner in a single housing, is also referred to as a multi-function apparatus.

The multi-function apparatus includes a display part, a printing part, and an image-capturing part as well as four types of software corresponding to a printer, a copier, a facsimile machine, and a scanner in a single housing. The multi-function apparatus operates as the printer, the copier, the facsimile machine, or the scanner by switching the software.

Figure 8:
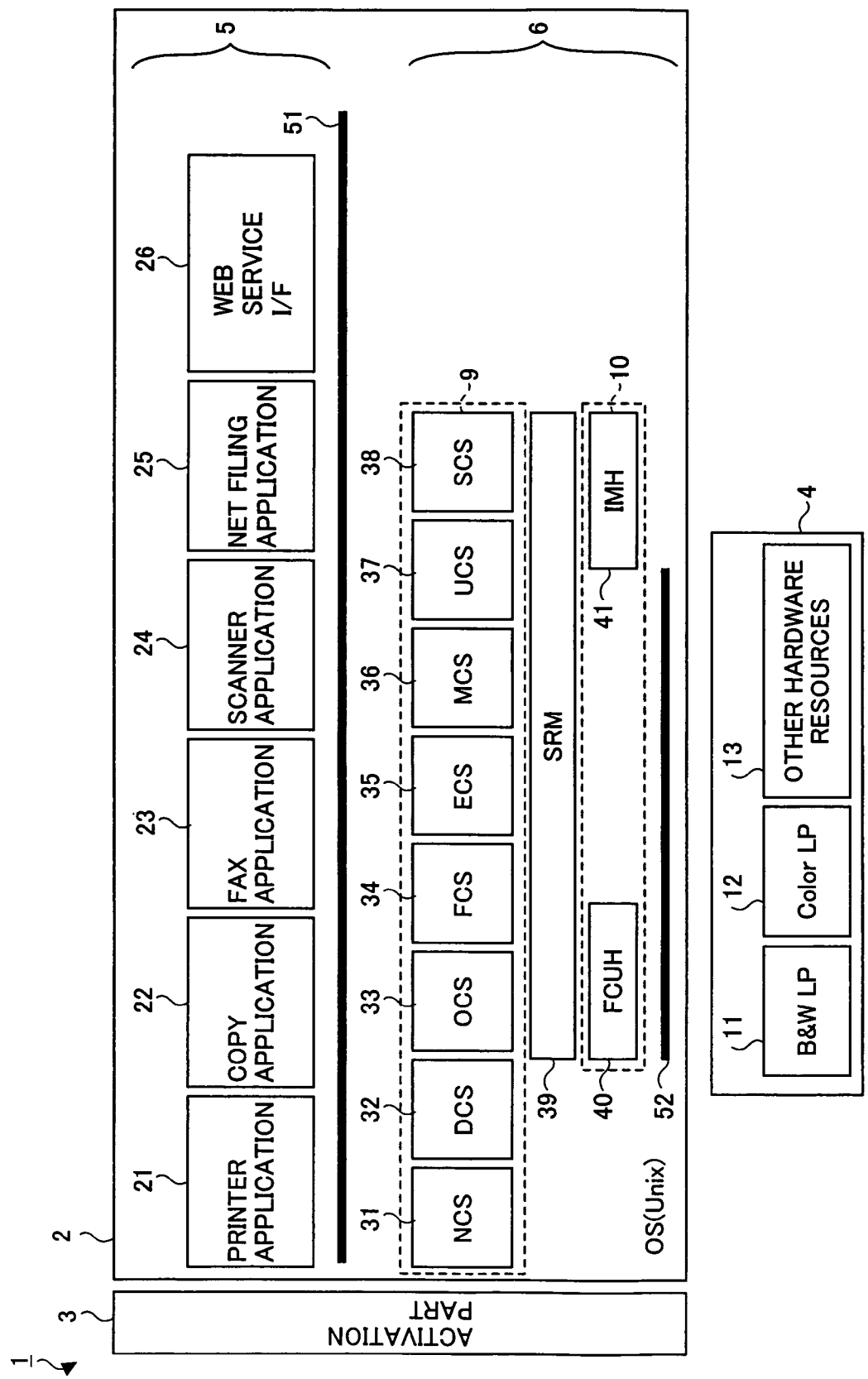
FIG. 8 is a block diagram showing a multi-function apparatus according to the present invention.

FIG. 8 is a block diagram showing a multi-function apparatus 1 according to the present invention. The multi-function apparatus 1 includes a software group 2, a multi-function apparatus activation part 3, and hardware resources 4.

When the multi-function apparatus 1 is turned on, the activation part 3 is started first to activate an application layer 5 and a platform 6. For instance, the activation part 3 reads out programs of the application layer 5 and the platform 6 from a hard disk drive unit (hereinafter, an HDD), and transfers the read-out programs to a memory area to activate the programs.

The hardware resources 4 include a black and white laser printer (B&W LP) 11, a color laser printer (color LP) 12, and other hardware resources 13 such as a scanner and a facsimile machine.

The software group 2 includes the application layer 5 and the platform 6 activated on an operating system (hereinafter, an OS) such as UNIX®. The application layer 5 includes programs performing operations peculiar to imaging-related user services such as printing, copying, facsimile communication, and scanning.

The application layer 5 includes a printer application 21, a copy application 22, a facsimile (FAX) application 23, a scanner application 24, a network filing application 25, and a Web service interface (I/F) 26.

The platform 6 includes a control service layer 9, a system resource manager (SRM) 39, and a handler layer 10. The control service layer 9 interprets a request for processing (a processing request) supplied from the application layer 5, and generates a request to obtain a hardware resource (an obtaining request) from the hardware resources 4. The SRM 39 manages one or more of the hardware resources 4 and arbitrates between the obtaining requests supplied from the control service layer 9. The handler layer 10 manages the hardware resources 4 in accordance with the obtaining request supplied from the SRM 39.

The control service layer 9 includes at least one service module. Specifically, the control service layer 9 includes a network control service (NCS) 31, a delivery control service (DCS) 32, an operation panel control service (OCS) 33, a facsimile control service (FCS) 34, an engine control service (ECS) 35, a memory control service (MCS) 36, a user information control service (UCS) 37, and a system control service (SCS) 38.

The platform 6 is configured to include an application program interface (API) 51 that receives the processing request supplied from the application layer 5 by a predefined function. The OS executes the software of the application layer 5 and the software of the platform 6 in parallel as processes.

The process of the NCS 31 distributes data received from the network side by respective protocols among the applications, and arbitrates between data from the applications when the data is transmitted to the network side.

For instance, the process of the NCS 31 controls data communications with a client connected through a network by HTTP (HyperText Transfer Protocol), using an HTTPd (HyperText Transfer Protocol Daemon).

The process of the DCS 32 controls the delivery of a stored document. The process of the OCS 33 controls an operations panel. The process of the FCS 34 provides the API 51 for performing facsimile transmission and reception by the application layer 5 using a PSTN or ISDN network, registering and citing a variety of facsimile data managed in a backup memory, reading facsimile communications, and printing received facsimile communications.

The process of the ECS 35 controls the engine parts of the B&W LP 11, the color LP 12, and the other hardware resources 13. The process of the MCS 36 performs the memory control operations of obtaining and freeing memory, using the HDD, and compressing and decompressing image data, for instance. The process of the UCS 37 manages user information.

The process of the SCS 38 performs processing such as application management, operation part control, system screen display, LED display, hardware resource management, and interrupting application control.

The process of the SRM 39 performs system control and management of the hardware resources 4 in cooperation with the SCS 38. For instance, the process of the SRM 39 performs arbitration and execution control according to a request from a higher layer to obtain a hardware resource such as the B&W LP 11 or the color LP 12 of the hardware resources 4.

Specifically, the process of the SRM 39 determines whether the requested one of the hardware resources 4 (or the requested hardware resource 4) is available, that is, whether the requested hardware resource 4 is being used by another obtaining request. If the requested hardware resource 4 is available, the SRM 39 notifies the higher layer that the requested hardware resource 4 is available. Further, in response to the requests supplied from the higher layer, the process of the SRM 39 performs scheduling for using the hardware resources 4, and directly carries out the contents of the requests such as paper feeding and image formation by the printer engine, memory reservation, and file creation.

Figure 9:
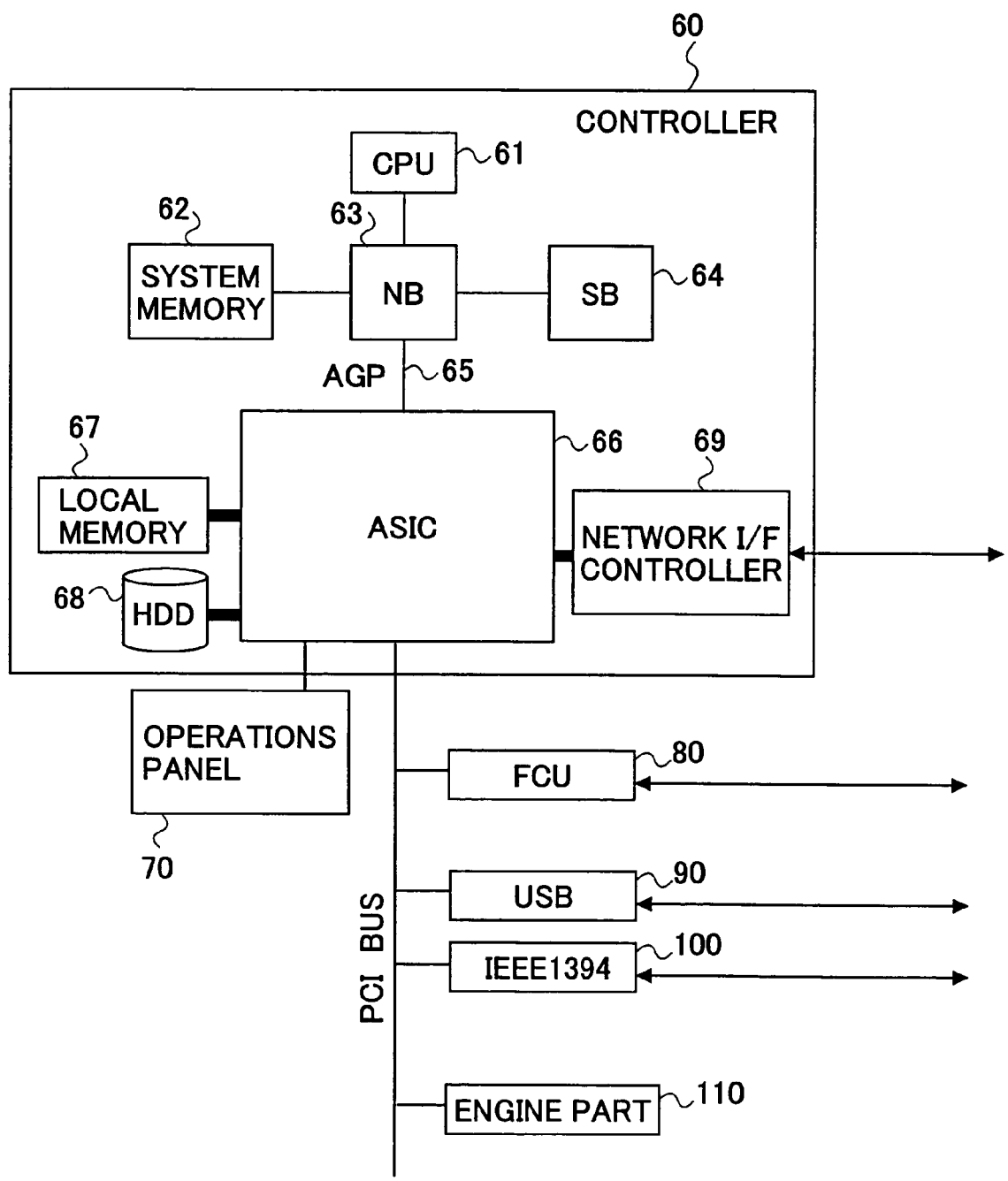
FIG. 9 is a block diagram showing a hardware configuration of the multi-function apparatus according to the present invention.

The handler layer 10 includes a facsimile control unit handler (FCUH) 40 and an image memory handler (IMH) 41. The FCUH 40 manages a below-described facsimile control unit (FCU) 80 (FIG. 9). The IMH 41 allocates memory to each process and manages the memory allocated to each process.

The SRM 39, the FCUH 40, and the IMH 41 make processing requests to the hardware resources 4 using an engine I/F 52 transmitting the processing requests to the hardware resources 4 by a predefined function.

The configuration of FIG. 8 allows the multi-function apparatus 1 to perform all necessary operations common to the applications in the platform layer 6.

Next, a description is given of the hardware configuration of the multi-function apparatus 1. FIG. 9 is a block diagram showing a hardware configuration of the multi-function apparatus 1 according to the present invention. The multi-function apparatus 1 includes a controller 60, an operations panel 70, the FCU 80, a USB device 90, an IEEE1394 device 100, and an engine part 110.

The controller 60 includes a CPU 61, a system memory 62, a Northbridge (NB) 63, a Southbridge (SB) 64, an ASIC (Application Specific Integrated Circuit). 66, a local memory 67, an HDD 68, and a network I/F controller 69.

The operations panel 70 is connected to the ASIC 66 of the controller 60. The FCU 80, the USB device 90, the IEEE1394 device 100 and the engine part 110 are connected to the ASIC 66 of the controller 60 via a PCI bus.

In the controller 60, the local memory 67, the HDD 68, and the network I/F controller 69 are connected to the ASIC 66, and the CPU 61 is connected to the ASIC 66 via the NB 63 of a CPU chipset. By connecting the CPU 61 and the ASIC 66 via the NB 63, it is possible to support the case where the interface of the CPU 61 is not open to the public.

In order to execute and control one or more of the processes forming the application layer 5 and the platform 6 of FIG. 8, the ASIC 66 and the NB 63 are connected not via a low-speed PCI bus but via an accelerated graphics port (AGP) 65, thereby preventing a decrease in performance.

The CPU 61 controls the entire multi-function apparatus 1. The CPU 61 activates the NCS 31, the DCS 32, the OCS 33, the FCS 34, the ECS 35, the MCS 36, the UCS 37, the SCS 38, the SRM 39, the FCUH 40, and the IMH 41 on the OS as processes, and causes them to be executed. The CPU 61 also activates the printer application 21, the copy application 22, the FAX application 23, and the scanner application 24, the network filing application 25, and the Web service I/F 26 of the application layer 5 on the OS, and causes them to be executed.

The NB 63 is a bridge for connecting the CPU 61, the system memory 62, the SB 64, and the ASIC 66. The system memory 62 is employed as the memory for image drawing of the multi-function apparatus 1. The SB 64 is a bridge for connecting a ROM, a PCI bus, and peripheral devices (not graphically represented) with the NB 63.

The local memory 67 is employed as an image buffer for copying and a code buffer. The ASIC 66 is an IC for image processing including a hardware element for image processing. The HDD 68 is a storage device for storing image data, document data, programs, font data, and forms. The operations panel 70 is an operation part receiving operations input by a user and displaying information to the user.

A description is given below of the operation of the multi-function apparatus 1 in the case of receiving a request including a character string (a request to change or collate a document name or an author name) from a client connected via a network to the multi-function apparatus 1.

[First Embodiment]

Figure 10:
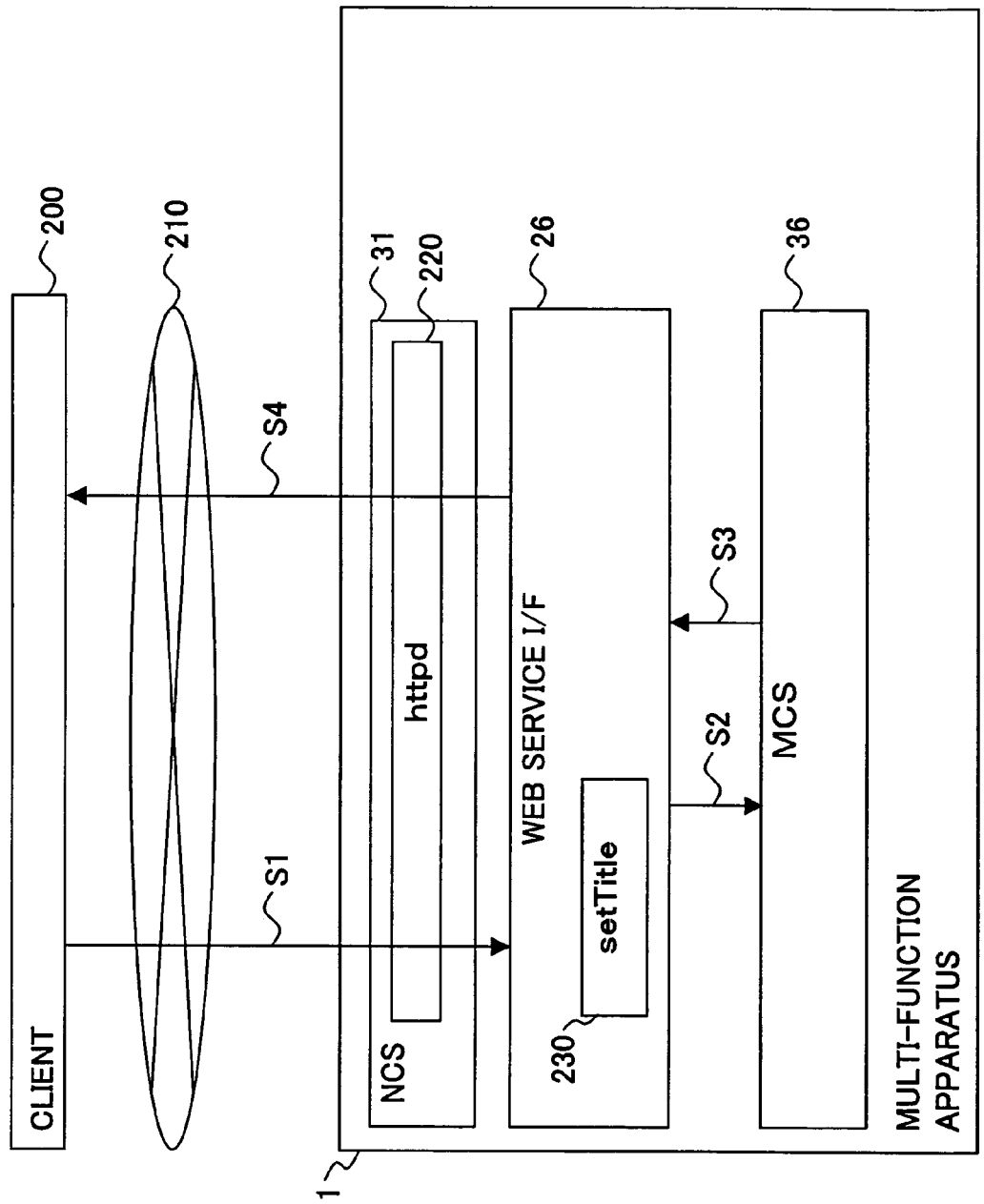
FIG. 10 is a block diagram showing a configuration of the multi-function apparatus for illustrating a character string processing method according to a first embodiment of the present invention.

FIG. 10 is a block diagram showing a configuration of the multi-function apparatus 1 for illustrating a character string processing method according to a first embodiment of the present invention. FIG. 10 omits configuration parts unnecessary for description.

Referring to FIG. 10, a client 200 is connected to the multi-function apparatus 1 via a network 210 such as the Internet or a LAN. The client 200 and the multi-function apparatus 1 exchange data in XML (extensible Markup Language) format. The client 200 and the multi-function apparatus 1 use a communication protocol standard called SOAP (Simple Object Access Protocol) as a data access protocol, for instance.

In step S1 of FIG. 10, the client 200 creates a SOAP message written in XML format as shown in FIG. 11. The client 200 stores (embeds) the SOAP message in an HTTP message and transmits the HTTP message to the multi-function apparatus 1. FIG. 11 is a diagram showing the structure of a SOAP message requesting to change a document name (a title). The HTTP message transmitted from the client 200 is supplied via a httpd 220 of the NCS 31 to the Web service I/F 26.

Receiving the HTTP message, the Web service I/F 26 interprets the SOAP message by a dispatcher, and thereafter, requests an object 230 of setTitle corresponding to the request to change the document name to perform processing.

The object 230 of setTitle, receiving a character string (a document name after the change) encoded by an encoding method other than that used in its internal processing, is required first to convert the received character string to a character string encoded by the encoding method used in the internal processing. A description is given herein of the case of converting a character string encoded by UTF-8 to a character string encoded by Shift-JIS or Latin1.

Being requested by the Web service I/F 26 to perform processing, the object 230 determines whether it is necessary to change the encoding method of the character string. If the object 230 determines that it is necessary, the object 230 performs processing represented by the flowchart of FIG. 12.

Figure 12:
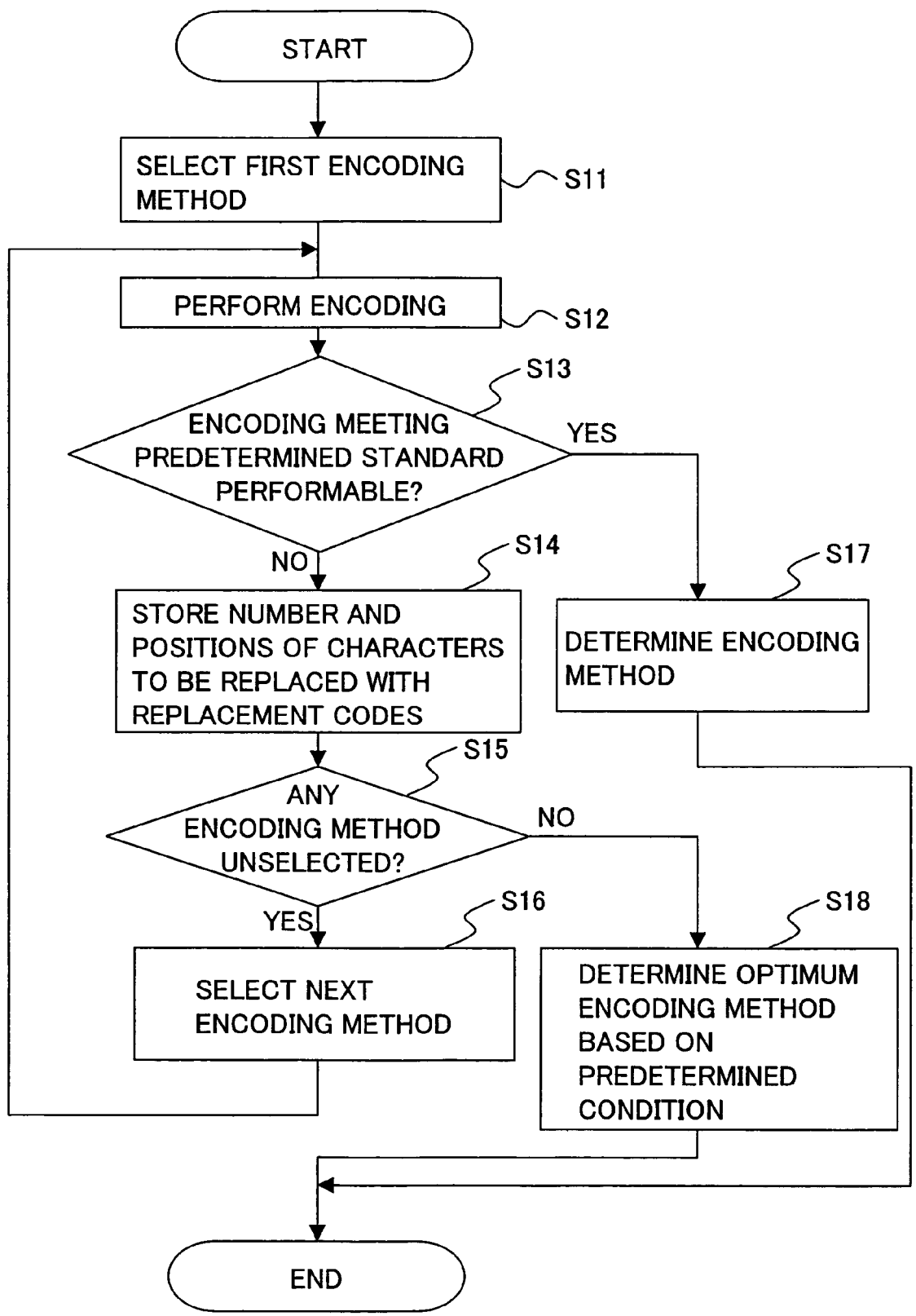
FIG. 12 is a flowchart of an encoding method determination operation according to the first embodiment of the present invention.

FIG. 12 is a flowchart of an encoding method determination operation. FIG. 13 is a lookup table showing the assignment of character codes according to each of UTF-8, Shift-JIS, and Latin1.

In step S11 of FIG. 12, the object 230 obtains a list of encoding methods available (usable) in the multi-function apparatus 1 from the HDD 68, and selects, for instance, Shift-JIS as the first encoding method. The available encoding methods may be arranged at random or in the order of priority in the list.

Next, in step S12, the object 230 encodes the character string「aöte作」whose encoding method is to be changed, by the encoding method Shift-JIS selected in step S11. Referring to the lookup table of FIG. 13, the character "ö" is not convertible to Shift-JIS. Next, in step S13, the object 230 determines by the result of the encoding in step S12 whether the character string is encodable by Shift-JIS selected in step S11 to or above the level of a predetermined standard. The predetermined standard may be complete encoding (that the entire character string is encodable) or that the number of characters inconvertible to the selected encoding method is less than or equal to a predetermined number. In this case, the predetermined standard is complete encoding.

In this case, complete encoding is not performable by Shift-JIS (that is, "NO" in step S13). Accordingly, the object 230 proceeds to step S14. If complete encoding is performable by the encoding method selected in step S11 (that is, "YES" in step S13), the object 230 settles on the encoding method selected in step S11, and ends the operation.

In step S14, the object 230 stores in, for instance, the system memory 62 the number of characters and the position of each character to be replaced with replacement codes obtained from the result of the encoding in step S12. In this case, the object 230 stores "one" as the number of characters to be replaced with replacement codes and "the second one from the beginning (the second character in the character string in the direction from its beginning toward its end)" as the position of a character to be replaced with a replacement code.

Next, in step S15, the object 230 determines whether any of the listed encoding methods remain unselected. In this case, Latin1 has yet to be selected (that is, "YES" in step S15). Therefore, the object 230 proceeds to step S16.

In step S16, the object 230 selects Latin1 subsequent to Shift-JIS in the encoding method list, and returns to step S12. In step S12, the object 230 encodes the character string「aöte作」whose encoding method is to be changed, by Latin1 selected in step S16. The lookup table of FIG. 13 shows that the character "作" is inconvertible to Latin1. Next, in step S13, the object 230 determines by the result of the encoding in step S12 whether the character string is completely encodable by Latin1 selected in step S16.

In this case, complete encoding is not performable by Latin1 (that is, "NO" in step S13). Therefore, the object 230 proceeds to step S14. In step S14, the object 230 stores in, for instance, the system memory 62 the number of characters and the position of each character to be replaced with replacement codes obtained from the result of the encoding in step S12. In this case, the object 230 stores "one" as the number of characters to be replaced with replacement codes and "the fifth one from the beginning" as the position of a character to be replaced with a replacement code.

Next, in step S15, the object 230 determines whether any of the listed encoding methods remain unselected. In this case, all the listed encoding methods have been selected (that is, "NO" in step S15). Therefore, the object 230 proceeds to step S18.

In step S18, the object 230 determines an optimum encoding method based on a predetermined condition using the numbers and the positions of characters to be replaced with replacement codes stored in step S14, and ends the operation.

For instance, in step S18, the encoding method having the smallest number of characters to be replaced with replacement codes may be determined as the optimum encoding method. Alternatively, the encoding method having the smallest number of times the characters to be replaced with replacement codes appear in succession may be determined as the optimum encoding method. An encoding method whose position of appearance of the first character to be replaced with a replacement code is the closest to the end of the character string may also be determined as the optimum encoding method.

Further, the encoding method whose average position of appearance of characters to be replaced with replacement codes is the closest to the end of the character string may also be determined as the optimum encoding method. Furthermore, the encoding method that appears first in the encoding method list may also be determined as the optimum encoding method.

In addition, the optimum encoding method may be determined by combining two or more of the above-described conditions or employing a point system based on two or more of the above-described conditions. For instance, in the case of determining as the optimum encoding method the encoding method having the smallest number of characters to be replaced with replacement codes and whose position of appearance of the first character to be replaced with a replacement code is the closest to the end of the character string, Latin1 is selected as the encoding method to encode the character string ″Göte作″.

It is also possible to determine the encoding method having the smallest number of characters to be replaced with replacement codes as the optimum encoding method, and determine the encoding method appearing first in the encoding method list if the smallest number of characters to be replaced with replacement codes is shared by two or more encoding methods.

After selecting the optimum encoding method by the flowchart of FIG. 12, the object 230 encodes the character string ″Göte作″ by the selected encoding method. The object 230 replaces an unencodable character with a replacement code. For instance, in the case of encoding ″Göte作″ by Latin1, the fifth character from the beginning "作" is replaced with a replacement code. Then, referring back to FIG. 10, the object 230 proceeds to step S2, where the object 230 requests the MCS 36 to change the document name using the encoded character string. The MCS 36 stores, for instance, bibliographic information data of a format as shown in FIG. 14 in the HDD 68. The MCS 36 updates the bibliographic information data at the request of the object 230 to change the document name.

Next, in step S3, the MCS 36 transmits a document name change response to the object 230. Receiving the document name change response, the object 230 notifies the Web service I/F 26 of the end of the operation.

In step S4, the Web service I/F 26 writes a SOAP message making a document name change response in XML format. The Web service I/F 26 embeds the SOAP message in an HTTP message, and transmits the HTTP message to the client 200.

Thus, according to the character string processing method of the first embodiment, an appropriate encoding method is selectable in converting a character string encoded by one encoding method to a character string encoded by another encoding method.

In FIG. 10, the object 230 of setTitle is provided in the Web service I/F 26. Alternatively, the object 230 may be provided in the MCS 36. In the case of providing the object 230 in the MCS 36, after interpreting the SOAP message by the dispatcher, the Web service I/F 26 requests the MCS 36 to change the document name. Then, the MCS 36 requests the object 230 of setTitle corresponding to the request to change the document name.

Requested by the Web service I/F 26 to change the document name, the object 230 determines whether it is necessary to change the encoding method of the character string. If it is necessary, the object 230 selects the optimum encoding method by the processing of the flowchart of FIG. 12. The object 230 encodes the character string by the selected encoding method, and replaces an unencodable character with a replacement code. Then, in step S2, the object 230 requests the MCS 36 to change the document name using the encoded character string. The rest of the operation is the same as in the case of providing the object 230 of setTitle in the Web service I/F 26.

The merit of providing the object 230 of setTitle in the Web service I/F 26 is that the character string processing method of the first embodiment, which is a function unnecessary to a multi-function apparatus not connected to the network 210, can be made an option for supporting Web services. On the other hand, the merit of providing the object 230 of setTitle in the MCS 36 is that the character string processing method of the first embodiment is also usable by another I/F such as a printer I/F.

[Second Embodiment]

A description is given below of a second embodiment of the present invention.

In the case of replacing an inconvertible character with a replacement code as in the first embodiment, there is a problem in that all characters replaced with replacement codes may be regarded as the same at the time of, for instance, collating the converted character string. Alternatively, if characters are regarded as identical only if the encoding methods are the same, there is a problem in that the identical characters may be regarded as different characters.

Therefore, the multi-function apparatus 1 according to the second embodiment solves the above-described problems by changing the encoding method of a first character string to be collated to the same encoding method as that of a second character string with which the first character string is to be collated, and treating a replacement code included in the converted first character string as a wild card.

FIG. 15 is a diagram for illustrating collation of character strings according to the second embodiment. For instance, referring to FIG. 15, ″Göte作″ encoded by UTF-8 is encoded by Shift-JIS or Latin1 and again encoded by UTF-8 into a character string, which is not identical to ″Göte作″.

Accordingly, by treating the unidentifiable character represented by the replacement code, a character string that exactly matches ″Göte作″ may be obtained by collation. Further, a character string whose beginning matches "Göte" may be obtained by collation. Further, according to UTF-8, different OSs such as Windows® and MAC® have different character codes assigned to the same character as shown in FIG. 16, for instance. FIG. 16 shows the configuration of a table in which exceptional characters are set. By presetting such exceptional characters in the table as show in FIG. 16, characters assigned different character codes by the character string processing method of the present invention may be regarded as the same. The table of FIG. 16 is a data retention format, and may be XML, for instance.

By using the table of FIG. 16, the character string processing method of the present invention can perform accurate collation on even a character string including an exceptional character. According to the character string processing method of the present invention, by setting the relationship between capital letters and small letters and the relationship between Japanese hiragana and katakana characters in a table as exceptional letters, different characters may also be regarded as the same.

FIG. 17 is a block diagram showing a configuration of the multi-function apparatus 1 for illustrating a character string processing method according to the second embodiment of the present invention. FIG. 17 omits configuration parts unnecessary for description. Further, the configuration of FIG. 17 of the multi-function apparatus 1 is equal to that of FIG. 10 except for some parts, and a description thereof is omitted as appropriate.

The multi-function apparatus 1 of FIG. 17 has an object 240 of search corresponding to a request to collate a document name provided in the Web service I/F 26, and includes a cache 250 used by the Web service I/F 26.

FIG. 18 is a flowchart for illustrating the operation of collating character strings. Referring to FIG. 18, when an instruction to set a document name accompanying the change of a document name or the creation of a document is given from the client 200 through the conversion of the encoding method of a character string or when an operator operates the operations panel 70 to give an instruction to change a document name or create a document, the OCS 33 of the multi-function apparatus 1 proceeds to step S21, where the OCS 33 transmits a request to change the document name or create the document to the MCS 36.

Next, in step S22, the MCS 36 receives the request to change the document name or create the document, and updates the bibliographic information data of FIG. 14 in accordance with the request. Then, the MCS 36 transmits a file change notification to the Web service I/F 26.

Figure 19:
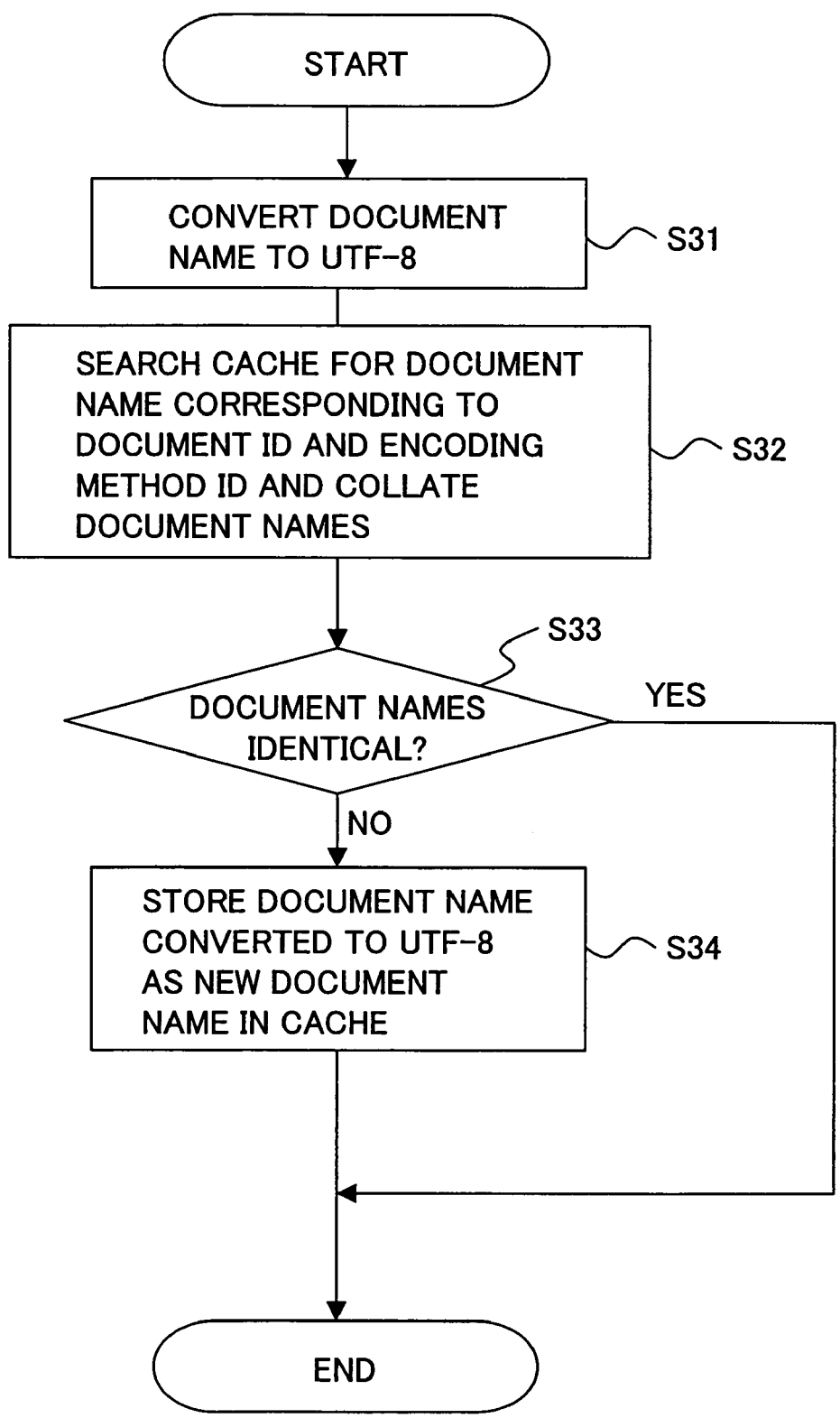
FIG. 19 is a flowchart of an encoding operation according to the second embodiment of the present invention.

The Web service I/F 26, receiving the file change notification, requests the object 240 of search to perform processing. FIG. 19 is a flowchart of an encoding operation according to the second embodiment.

In step S31 of FIG. 19, the document name included in the received file change notification is converted to a document name encoded by UTF-8 since the document name included in the received file change notification is encoded by Shift-JIS or Latin1 used in the internal processing. Next, in step S32, using the document ID included in the received file change notification as key information, the object 240 searches the cache 250 for the corresponding document name and collates the corresponding document name with the encoded document name.

Next, in step S33, the object 240 determines from the result of the collation in step S32 whether the document name encoded by UTF-8 and the document name searched out from the cache 250 are identical.

If the object 240 determines that the document name encoded by UTF-8 and the document name searched out from the cache 250 are identical (that is, "YES" in step S33), the object 240 ends the encoding operation of FIG. 19.

For instance, if the document name encoded by UTF-8 is ⌈ａ□ｔｏｆｆ⌋ and the document name searched out from the cache 250 is ⌈aütoff⌋ the document name encoded by UTF-8 and the document name searched out from the cache 250 can be regarded as identical by treating the unidentifiable character represented by the replacement code as a wild card as described above. In the case of setting a document name from the client 200, this case occurs if a character string before being converted to an encoding method used in the internal processing is first stored in the cache 250 at the time of setting the document name from the client 200.

On the other hand, if the object 240 determines that the document name encoded by UTF-8 and the document name searched out from the cache 250 are not identical (that is, "NO" in step S33), the object 240 stores the document name encoded by UTF-8 as a new document name in the cache 250, and ends the encoding operation.

For instance, if the document name encoded by UTF-8 is ⌈ｻｰﾃﾌ⌋ and the document name searched out from the cache 250 is ⌈aütoff⌋ the document name encoded by UTF-8 and the document name searched out from the cache 250 cannot be regarded as identical. Accordingly, the object 240 stores the document name encoded by UTF-8 ⌈ｻｰﾃﾌ⌋ as a new document name in the cache 250. In the case of setting a document name from the client 200, if a character string before being converted to an encoding method used in the internal processing is not stored in the cache 250, the document name searched out from the cache 250 may not be ⌈ů⌋ but be ⌈ａ□ｔｏｆｆ⌋

However, even if the unidentifiable character is treated as a wild card, it is not identical to ⌈ｻｰﾃﾌ⌋

Therefore, the same result is produced.

Thus, in the multi-function apparatus 1 of FIG. 17, when there is a document name to be changed, the encoding method of the document name is changed from Shift-JIS or Latin1 used in the internal processing to UTF-8.

Referring back to FIG. 18, in step S23, the client 200 creates a SOAP message written in XML format as shown in FIG. 20. The client 200 embeds the SOAP message in an HTTP message and transmits the HTTP message to the multi-function apparatus 1. FIG. 20 is a diagram showing the structure of a SOAP message requesting to search for a document name. The HTTP message transmitted from the client 200 is supplied via the httpd 220 of the NCS 31 to the Web service I/F 26.

Receiving the HTTP message, the Web service I/F 26 interprets the SOAP message by the dispatcher and requests the object 240 of search to perform processing (to search for a document name).

Receiving a character string encoded by UTF-8 (the document name to be searched for), the object 240 searches the cache 250 for the corresponding document name using the character string as key information, and collates the searched-out document name with the character string. After completing the collation of the character string, the object 240 notifies the Web service I/F 26 of the end of the operation.

In step S24, the Web service I/F 26 writes a SOAP message making a document name search response in XML format. The Web service I/F 26 embeds the SOAP message in an HTTP message, and transmits the HTTP message to the client 200.

Thus, according to the character string processing method of the second embodiment, when a character string after conversion is collated with a character string before conversion, the difference of the character string after conversion due to the difference between encoding methods can be absorbed. Further, the use of the cache 250 saves the trouble of querying the MCS 36 every time the character string after conversion is collated. Further, by employing a method that allows a character string before being converted to an encoding method used in the internal processing to be stored in the cache 250 in the case of setting a document name from the client 200, character strings before conversion including no unidentifiable characters are collated at the time of performing document name search from the client 200. Accordingly, the search accuracy is higher than in the case of treating an unidentifiable character as a wild card.

According to the configuration of FIG. 17, the object 240 of search is provided in the Web service I/F 26. Alternatively, the object 240 may be provided in the MCS 36. FIG. 21 is a flowchart for illustrating the operation of collating character strings in the case of providing the object 240 in the MCS 36.

Referring to FIG. 21, when an instruction to set a document name accompanying the change of a document name or the creation of a document is given from the client 200 through the conversion of the encoding method of a character string or when an operator operates the operations panel 70 to give an instruction to change a document name or create a document, the OCS 33 of the multi-function apparatus 1 proceeds to step S41, where the OCS 33 transmits a request to change the document name or create the document to the MCS 36.

Receiving the request to change the document name or create the document, the MCS 36 updates the bibliographic information data of FIG. 14 in accordance with the request. Then, the MCS 36 requests the object 240 of search to perform processing.

The object 240 performs the encoding operation as shown in FIG. 19. If the object 240 determines that the document name encoded by UTF-8 and the document name searched out from the cache 50 cannot be regarded as identical, the object 240 stores the document name encoded by UTF-8 as a new document name in the cache 250.

Thus, in the multi-function apparatus 1 of FIG. 17, when there is a document name to be changed, the encoding method of the document name is changed from Shift-JIS or Latin1 used in the internal processing to UTF-8.

In step S42, the client 200 creates a SOAP message written in XML format as shown in FIG. 20. The client 200 embeds the SOAP message in an HTTP message and transmits the HTTP message to the multi-function apparatus 1. The HTTP message transmitted from the client 200 is supplied via the httpd 220 of the NCS 31 to the Web service I/F 26.

Receiving the HTTP message, the Web service I/F 26 interprets the SOAP message by the dispatcher. Then, in step S43, the Web service I/F 26 transmits a request to search for a document name to the MCS 36. The MCS 36, receiving the request, requests the object 240 of search to perform processing.

Receiving a character string encoded by UTF-8 (the document name to be searched for), the object 240 searches the cache 250 for the corresponding document name using the character string as key information, and collates the searched-out document name with the character string. After completing the collation of the character string, the object 240 notifies the MCS 36 of the end of the operation.

In step S44, the MCS 36 transmits the result of the search of the document name to the Web service I/F 26. In step S45, the Web service I/F 26 writes a SOAP message making a document name search response in XML format. The Web service I/F 26 embeds the SOAP message in an HTTP message, and transmits the HTTP message to the client 200.

Thus, according to the character string processing method of the second embodiment, when a character string after conversion is collated with a character string before conversion, the difference of the character string after conversion due to the difference between encoding methods can be absorbed.

The merit of providing the object 240 of search in the Web service I/F 26 is that the character string processing method of the second embodiment, which is a function unnecessary to a multi-function apparatus not connected to the network 210, can be made an option for supporting Web services. On the other hand, the merit of providing the object 240 of search in the MCS 36 is that the character string processing method of the second embodiment is also usable by another I/F such as a printer I/F.

The multi-function apparatus 1 of the above-described first embodiment does not include the cache 250. Like the configuration of FIG. 17, however, the multi-function apparatus 1 of the first embodiment (FIG. 10) may also include the cache 250 used by the Web service I/F 26 or the MCS 36.

By incorporating the cache 250 in the multi-function apparatus 1 of the first embodiment, a character string before conversion can be stored in the cache 250. Thus, by storing the character string before conversion in the cache 250, the character string before conversion can be used for collation of character strings so that the collation accuracy can be improved.

[Third Embodiment]

A description is given below of a third embodiment of the present invention.

In the above-described first embodiment, the order of priority of encoding methods is fixed. However, the order of priority of encoding methods may vary depending on various conditions. Accordingly, in the third embodiment, a description is given of the case where the order of priority of encoding methods varies depending on various conditions.

Figure 22:
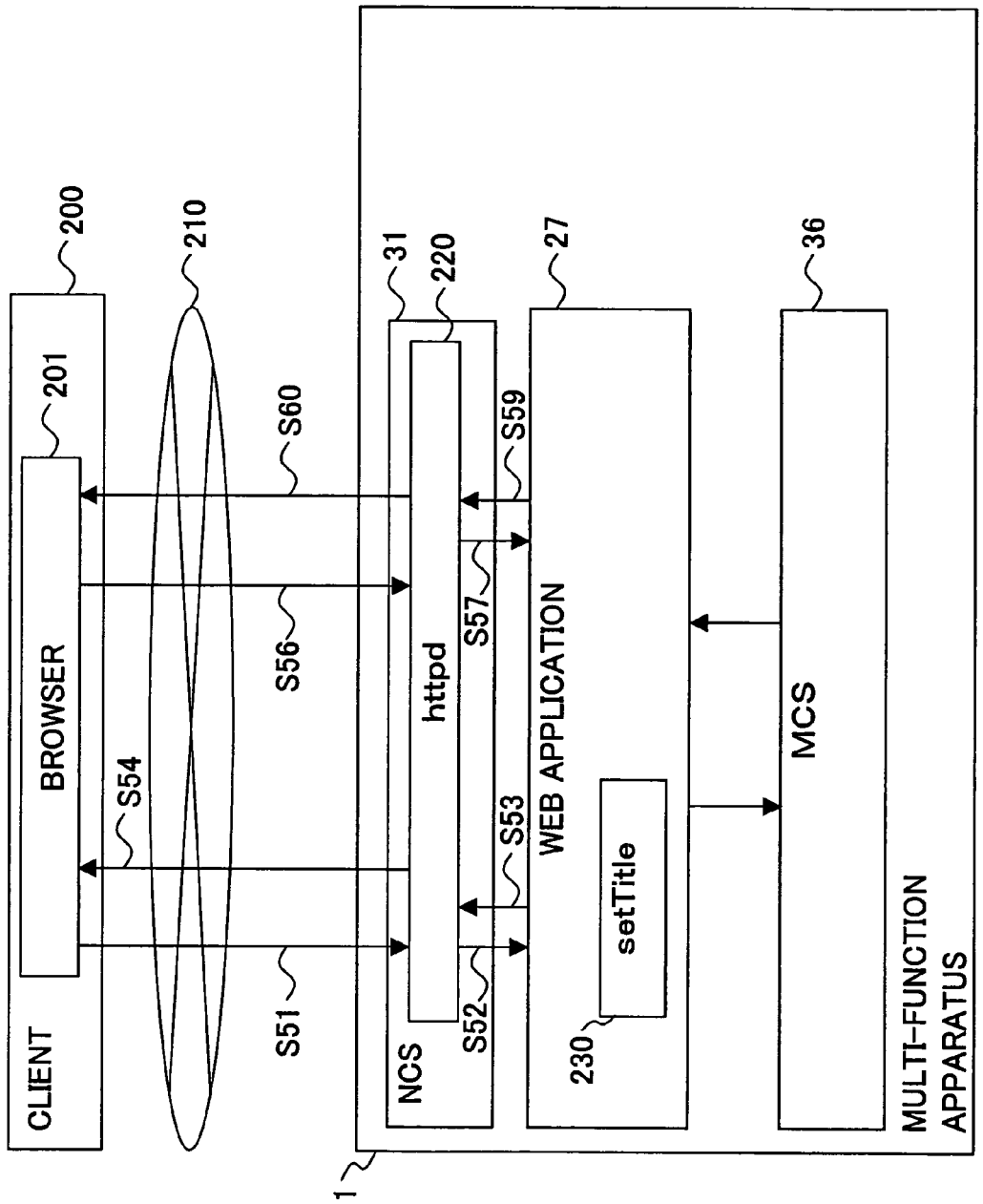
FIG. 22 is a block diagram showing a configuration of the multi-function apparatus for illustrating a character string processing method according to a third embodiment of the present invention.

FIG. 22 is a block diagram showing a configuration of the multi-function apparatus 1 for illustrating a character string processing method according to the third embodiment of the present invention. FIG. 23 is a sequence diagram for illustrating the character string processing method according to the third embodiment. FIGS. 22 and 23 omit configuration parts unnecessary for description. Further, the configuration of FIG. 22 is equal to that of FIG. 10 except for some parts, and a description thereof is omitted as appropriate.

In step S51 of FIG. 23, a browser 201 of the client 200 makes an http request, specifying a URL. The URL specified in step S51 is, for instance, "http://111.222.33.44/ja/documentbox/." The URL is an example in the case where the display language of the browser 201 is Japanese. Japanese is specified as the display language by "ja" in the URL. The http request transmitted from the browser 201 is supplied to the httpd 220 included in the NCS 31 of the multi-function apparatus 1.

Next, in step S52, the httpd 220 supplies a Web application 27 with the http request supplied from the browser 201. Receiving the http request, the Web application 27 specifies the display language of the browser 201 from the URL specified by the http request, and generates screen data according to the display language.

Next, in step S53, the Web application 27 supplies the generated screen data to the httpd 220. Then, in step S54, the httpd 220 transmits the supplied screen data to the browser 201 of the client 200.

Receiving the screen data, the browser 201 proceeds to step S55, where the browser 201 displays a screen according to the screen data. Then, a user inputs a character string on the screen displayed on the browser 201. Next, in step S56, the browser 201 of the client 200 makes an http request including the character string input on the screen in step S55. The http request transmitted from the browser 201 is supplied to the httpd 220 of the multi-function apparatus 1.

In step S57, the httpd 220 supplies the Web application 27 with the supplied http request. Receiving the http request, the Web application 27 proceeds to step S58, where the Web application 27 obtains the character string included in the http request, and requests the object 230 of setTitle to perform processing.

If the character string received by the object 230 of setTitle is encoded by an encoding method other than an encoding method used in the internal processing, the object 230 is required to convert the received character string to a character string encoded by the encoding method used in the internal processing. Accordingly, the object 230 determines whether it is necessary to change the encoding method of the received character string, and if it is necessary, the object 230 performs the above-described processing of the flowchart of FIG. 12.

The third embodiment is different from the first embodiment in the processing of step S11 of FIG. 12. The object 230 determines the order of priority of encoding methods as follows, and selects an encoding method in accordance with the determined order of priority. The determination of the order of priority is performed as follows. First, an encoding method supporting the display language of the browser 201 is given high priority, an encoding method supporting the display language of the operations panel 70 is given middle priority, and the other encoding methods are given low priority. In this case, the encoding method supporting the display language of the browser 201 has the highest priority, the encoding method supporting the display language of the operations panel 70 has the next highest priority, and the other encoding methods have the lowest priority.

Steps other than step S11 are the same as in the first embodiment, and a description thereof is omitted. After selecting the optimum encoding method in accordance with the flowchart of FIG. 12, the object 230 encodes the character string by the selected encoding method. The object 230 replaces an unencodable character with a replacement code.

Then, in step S59, the Web application 27 generates screen data according to the http request of step S57, and supplies the screen data to the httpd 220. Next, in step S60, the httpd 220 transmits the supplied screen data to the browser 201 of the client 200.

Thus, according to the character string processing method of the third embodiment, the order of priority of encoding methods is allowed to vary depending on various conditions at the time of converting a character string encoded by one encoding method to a character string encoded by another encoding method. Accordingly, it is possible to select an appropriate encoding method.

In the configuration of FIG. 22, the object 230 of setTitle is provided in the Web application 27. Alternatively, the object 230 may be provided in the MCS 36. The merit of providing the object 230 of setTitle in the Web application 27 is that the character string processing method of the third embodiment, which is a function unnecessary to a multi-function apparatus not connected to the network 210, can be made an option of the Web application 27. On the other hand, the merit of providing the object 230 of setTitle in the MCS 36 is that the character string processing method of the third embodiment is also usable by another application such as the printer application 21.

According to the present invention, when a first character string encoded by a first encoding method is converted to (a second character string encoded by) a second encoding method, the second encoding method may be determined based on the number information and the position information of one or more replacement codes (the number of replacement codes and the position of each replacement code). Further, according to the present invention, a replacement code included in the second character string encoded by the second encoding method may be treated as a character having the role of representing any character (as a wild card).

The present invention is not limited to the specifically disclosed embodiments, and variations and modifications may be made without departing from the scope of the present invention.

According to the present invention, a character string processing apparatus converting a character string encoded by a first encoding method to (another character string encoded by) a second encoding method selected from a plurality of encoding methods includes an encoding method determination part that selects the encoding methods, obtains, with respect to each selected encoding method, at least one of number information and position information of one or more replacement codes at the time of converting the character string to the selected encoding method, and determines the second encoding method based on at least one of the number information and the position information.

The encoding method determination part may determine one of the encoding methods which one has the smallest number of replacement codes as the second encoding method based on the number information.

The encoding method determination part may determine one of the encoding methods which one has the smallest number of times the replacement codes appear in succession as the second encoding method based on the number information.

The encoding method determination part may determine one of the encoding methods as the second encoding method based on the position information, of which one position of appearance of the initial one of the replacement codes is the closest to the end of the converted character string.

The encoding method determination part may determine one of the encoding methods as the second encoding method based on the position information, of which one average position of appearance of the replacement codes is the closest to the end of the converted character string.

The encoding method determination part may determine the second encoding method from the combination of the number of replacement codes, the number of times the replacement codes appear in succession, the position of appearance of the initial one of the replacement codes, and the average position of appearance of the replacement codes based on the number and position information.

The encoding method determination part may convert the number of replacement codes, the number of times the replacement codes appear in succession, the position of appearance of the initial one of the replacement codes, and the average position of appearance of the replacement codes into numeric values, and determine the second encoding method based on the numeric values.

When any of the number of replacement codes, the number of times the replacement codes appear in succession, the position of appearance of the initial one of the replacement codes, and the average position of appearance of the replacement codes is shared by two or more of the encoding methods, the encoding method determination part may determine one of the two or more of the encoding methods which one appears first in a list of the encoding methods as the second encoding method based on the number information and the position information.

When any of the number of replacement codes, the number of times the replacement codes appear in succession, the position of appearance of the initial one of the replacement codes, and the average position of appearance of the replacement codes is shared by two or more of the encoding methods, the encoding method determination part may determine the second encoding method in accordance with the priorities of the encoding methods based on the number information and the position information.

If the replacement codes do not appear when the character string is converted to the selected encoding method, the encoding method determination part may determine the selected encoding method as the second encoding method.

The present application is based on Japanese priority patent applications No. 2003-016427, filed on Jan. 24, 2003, and No. 2004-004123, filed on Jan. 9, 2004, the entire contents of which are hereby incorporated by reference.

What is claimed is:

1. A character string processing apparatus converting a character string encoded by a first encoding method to a second encoding method selected from a plurality of encoding methods, the character string processing apparatus comprising:
    an encoding method determination part that selects the encoding methods, obtains, with respect to each selected encoding method, at least one of number information and position information of one or more replacement codes at a time of converting the character string using the selected encoding method, and determines the second encoding method based on at least one of the number information and the position information.

2. The character string processing apparatus as claimed in claim 1, wherein said encoding method determination part selects the encoding methods according to an order, and if the at least one of the number information and the position information of the replacement codes at a time of converting the character string using the selected encoding method fails to meet a predetermined standard, selects a next one of the encoding methods.

3. The character string processing apparatus as claimed in claim 1, wherein said encoding method determination part selects the encoding methods according to an order of priority, and if the at least one of the number information and the position information of the replacement codes at a time of converting the character string using the selected encoding method fails to meet a predetermined standard, selects a next one of the encoding methods.

4. The character string processing apparatus as claimed in claim 3, wherein the order of priority of the encoding methods varies depending on a language set as a display language of an operations panel.

5. The character string processing apparatus as claimed in claim 3, wherein the order of priority of the encoding methods varies depending on a language set as a display language of a client that has given an instruction to convert the character string.

6. The character string processing apparatus as claimed in claim 1, wherein said encoding method determination part determines the second encoding method based on an order of priority of the encoding methods if said encoding method determination part is prevented from determining the second encoding method on the at least one of the number information and the position information of the replacement codes.

7. The character string processing apparatus as claimed in claim 1, wherein said encoding method determination part determines the selected encoding method as the second encoding method if the at least one of the number information and the position information of the replacement codes at the time of converting the character string using the selected encoding method meets the predetermined standard.

8. The character string processing apparatus as claimed in claim 1, wherein each of the replacement codes is a character code replacing a character in the character string which character is inconvertible using the selected encoding method.

9. A character string processing apparatus that, using a first character string encoded by a first encoding method, collates a second character string encoded by a second encoding method, the character string processing apparatus comprising:
    a character string collation part that converts the second character string to the first encoding method, and at a time of collating the converted second character string with the first character string, treats a replacement code included in the converted second character string as a character having a role of representing any character.

10. The character string processing apparatus as claimed in claim 9, further comprising a storage part storing the second character string before being encoded by the second encoding method,
    wherein the second character string before being encoded by the second encoding method stored in said storage part is used when the second character string is collated with the first character string.

11. The character string processing apparatus as claimed in claim 9, further comprising a table in which of characters encoded by the first encoding method, a character to which different character codes are assigned is set.

12. The character string processing apparatus as claimed in claim 9, wherein the replacement code is a character code replacing a character in the second character string which character is inconvertible to the first encoding method.

13. A character string processing method converting a character string encoded by a first encoding method to a second encoding method selected from a plurality of encoding methods, the character string processing method comprising the steps of:
    (a) selecting the encoding methods;
    (b) obtaining, with respect to each selected encoding method, at least one of number information and position information of one or more replacement codes at a time of converting the character string using the selected encoding method; and
    (c) determining the second encoding method based on at least one of the number information and the position information.

14. The character string processing method as claimed in claim 13, wherein each of the replacement codes is a character code replacing a character in the character string which character is inconvertible to the selected encoding method.

15. A character string processing method that, using a first character string encoded by a first encoding method, collates a second character string encoded by a second encoding method, the character string processing method comprising the steps of:
 (a) converting the second character string to the first encoding method; and
 (b) collating the converted second character string with the first character string, treating a replacement code included in the converted second character string as a character having a role of representing any character.

16. The character string processing method as claimed in claim 15, wherein the replacement code is a character code replacing a character in the second character string which character is inconvertible to the first encoding method.

17. An image-forming apparatus including a character string processing part converting a character string encoded by a first encoding method to a second encoding method selected from a plurality of encoding methods, the image-forming apparatus comprising:
 an encoding method determination part that selects the encoding methods, obtains, with respect to each selected encoding method, at least one of number information and position information of one or more replacement codes at a time of converting the character string using the selected encoding method, and determines the second encoding method based on at least one of the number information and the position information.

18. The image-forming apparatus as claimed in claim 17, wherein each of the replacement codes is a character code replacing a character in the character string which character is inconvertible to the selected encoding method.

19. An image-forming apparatus including a character string processing part that, using a first character string encoded by a first encoding method, collates a second character string encoded by a second encoding method, the image-forming apparatus comprising:
 a character string collation part that converts the second character string to the first encoding method, and at a time of collating the converted second character string with the first character string, treats a replacement code included in the converted second character string as a character having a role of representing any character.

20. The image-forming apparatus as claimed in claim 19, wherein the replacement code is a character code replacing a character in the second character string which character is inconvertible to the first encoding method.

* * * * *